(12) United States Patent
Khalid et al.

(10) Patent No.: US 11,729,806 B2
(45) Date of Patent: Aug. 15, 2023

(54) METHODS AND APPARATUS FOR RADIO CONFIGURATION IN A WIRELESS SYSTEM

(71) Applicant: Charter Communications Operating, LLC, St. Louis, MO (US)

(72) Inventors: Saran Khalid, Denver, CO (US); Perwaiz Akhtar, Aurora, CO (US)

(73) Assignee: CHARTER COMMUNICATIONS OPERATING, LLC, St. Louis, MO (US)

( * ) Notice: Subject to any disclaimer, the term of this patent is extended or adjusted under 35 U.S.C. 154(b) by 0 days.

(21) Appl. No.: 16/741,509

(22) Filed: Jan. 13, 2020

(65) Prior Publication Data
US 2021/0219303 A1  Jul. 15, 2021

(51) Int. Cl.
| | |
|---|---|
| *H04W 16/14* | (2009.01) |
| *H04W 88/08* | (2009.01) |
| *H04W 84/12* | (2009.01) |
| *H04B 1/7097* | (2011.01) |
| *H04B 17/382* | (2015.01) |
| *H04W 92/18* | (2009.01) |
| *H04W 40/24* | (2009.01) |
| *H04W 76/30* | (2018.01) |
| *H04W 72/54* | (2023.01) |
| *H04W 76/15* | (2018.01) |

(52) U.S. Cl.
CPC ........... *H04W 72/54* (2023.01); *H04W 76/15* (2018.02)

(58) Field of Classification Search
CPC ..... H04B 1/005; H04B 7/088; H04L 27/0006; H04L 36/0072; H04L 24/10; H04L 41/5019; H04L 47/2425; H04W 36/0085; H04W 72/042; H04W 24/10; H04W 28/24

USPC .................................. 455/452.2; 370/330
See application file for complete search history.

(56) References Cited

U.S. PATENT DOCUMENTS

2003/0146826 A1 * 8/2003 Viana .................... G01S 13/931
340/435
2005/0186956 A1   8/2005 Grindahl
(Continued)

OTHER PUBLICATIONS

Deering et al., "Internet Protocol, Version 6 (Ipv6) Specification, IETF RFC 2460," Dec. 1998.
(Continued)

*Primary Examiner* — Khaled M Kassim
*Assistant Examiner* — Jason A Harley
(74) *Attorney, Agent, or Firm* — Patent Beach PC

(57) ABSTRACT

Methods and apparatus related to radio configuration of a wireless device, such as for use in a quasi-licensed wireless system. In one embodiment, a computerized apparatus is provided, which comprises at least one computer program configured to: (i) detect at least one connectable wireless network; (ii) obtain data relating to one or more associated network conditions; and (iii) change radio configuration of the wireless device based on the obtained data e.g., to enable the wireless device to connect to an optimal base station. In one variant, the data relating to the one or more network conditions is obtained via one or more configurable logic blocks (CLBs) of the wireless device. In one implementation, a CLB can be configured to e.g., generate network data traffic to detect the network conditions. Furthermore, the CLBs can be configured to activate or de-activate individual ones of an array of radios with sectorized antenna of the wireless device.

19 Claims, 25 Drawing Sheets

(56) References Cited

U.S. PATENT DOCUMENTS

| | | |
|---|---|---|
| 2010/0094956 A1 | 4/2010 | Zuckerman et al. |
| 2011/0014924 A1 | 1/2011 | Hwang et al. |
| 2014/0194068 A1 | 7/2014 | Coppage et al. |
| 2015/0229564 A1 | 8/2015 | Hong |
| 2016/0062242 A1* | 3/2016 | Hamaguchi ........... G03F 7/0046 174/251 |
| 2016/0066242 A1* | 3/2016 | Su ................... H04W 36/00837 455/436 |
| 2016/0149622 A1* | 5/2016 | Ma ....................... H04B 7/0473 370/329 |
| 2016/0150415 A1* | 5/2016 | Laneman .............. H04W 16/14 455/452.2 |
| 2016/0212031 A1 | 7/2016 | Jain et al. |
| 2017/0140073 A1* | 5/2017 | Chakraborty ......... G06F 30/327 |
| 2018/0343567 A1* | 11/2018 | Ashrafi ................... H04L 67/10 |
| 2019/0319814 A1 | 10/2019 | Das |
| 2019/0364435 A1* | 11/2019 | Ahmavaara ........... H04W 24/08 |
| 2019/0392299 A1* | 12/2019 | Ma ......................... H03K 19/21 |
| 2020/0092712 A1 | 3/2020 | Zhao |
| 2020/0169339 A1 | 5/2020 | Patel |
| 2020/0221518 A1* | 7/2020 | Schmitz ................ H04L 41/147 |
| 2020/0344515 A1 | 10/2020 | Wong et al. |
| 2021/0076223 A1 | 3/2021 | Taneja |
| 2021/0084658 A1 | 3/2021 | Sheriff |
| 2021/0136838 A1 | 5/2021 | Khalid et al. |
| 2021/0185541 A1 | 6/2021 | Potharaju |
| 2021/0211887 A1* | 7/2021 | Jones ................... H04W 28/06 |
| 2021/0219143 A1 | 7/2021 | Khalid et al. |

OTHER PUBLICATIONS

IEEE Std. 802.11 or related standards including 802.11a/b/g/n/s/v/ac/ad/ax/ay/ba/be or 802.11-2012/2013, 802.11-2016.

"Internet Protocol, DARPA Internet Program, Protocol Specification", IETF RCF 791, Sep. 1981, 50 pages.

Signaling Protocols and Procedures for Citizens Broadband Radio Service (CBRS): Spectrum Access System, (SAS)—Citizens Broadband Radio Service Device (CBSD) Interface Technical Specification—Document WINNF-TS-0016, Version V1.2.1.3, Jan. 3, 2018, 60 pages.

"Wi-Fi Peer-to-Peer (P2P) Specification", Version 1.5, 2014, Wi-Fi Alliance, 90 pages.

Palola M., et al., "Field Trial of the 3.5 GHz Citizens Broadband Radio ServiceGoverned by a Spectrum Access System (SAS)," IEEE International Symposium on Dynamic Spectrum Access Networks, 2017, 9 pages.

* cited by examiner

| RADIO ID | BASE STATION ID | SLA DL REQUIREMENT | SLA UL REQUIREMENT | MEASURED DL/UL KPIs |
|---|---|---|---|---|
| 1 | ⋮ | 11 Mbps | 2 Mbps | ⋮ |
| ⋮ | ⋮ | ⋮ | ⋮ | ⋮ |
| 8 | ⋮ | 10 Mbps | 1 Mbps | ⋮ |
| ⋮ | ⋮ | ⋮ | ⋮ | ⋮ |
| 11 | ⋮ | 8 Mbps | 1 Mbps | ⋮ |
| ⋮ | ⋮ | ⋮ | ⋮ | ⋮ |
| N | ⋮ | ⋮ | ⋮ | ⋮ |

FIG. 5D

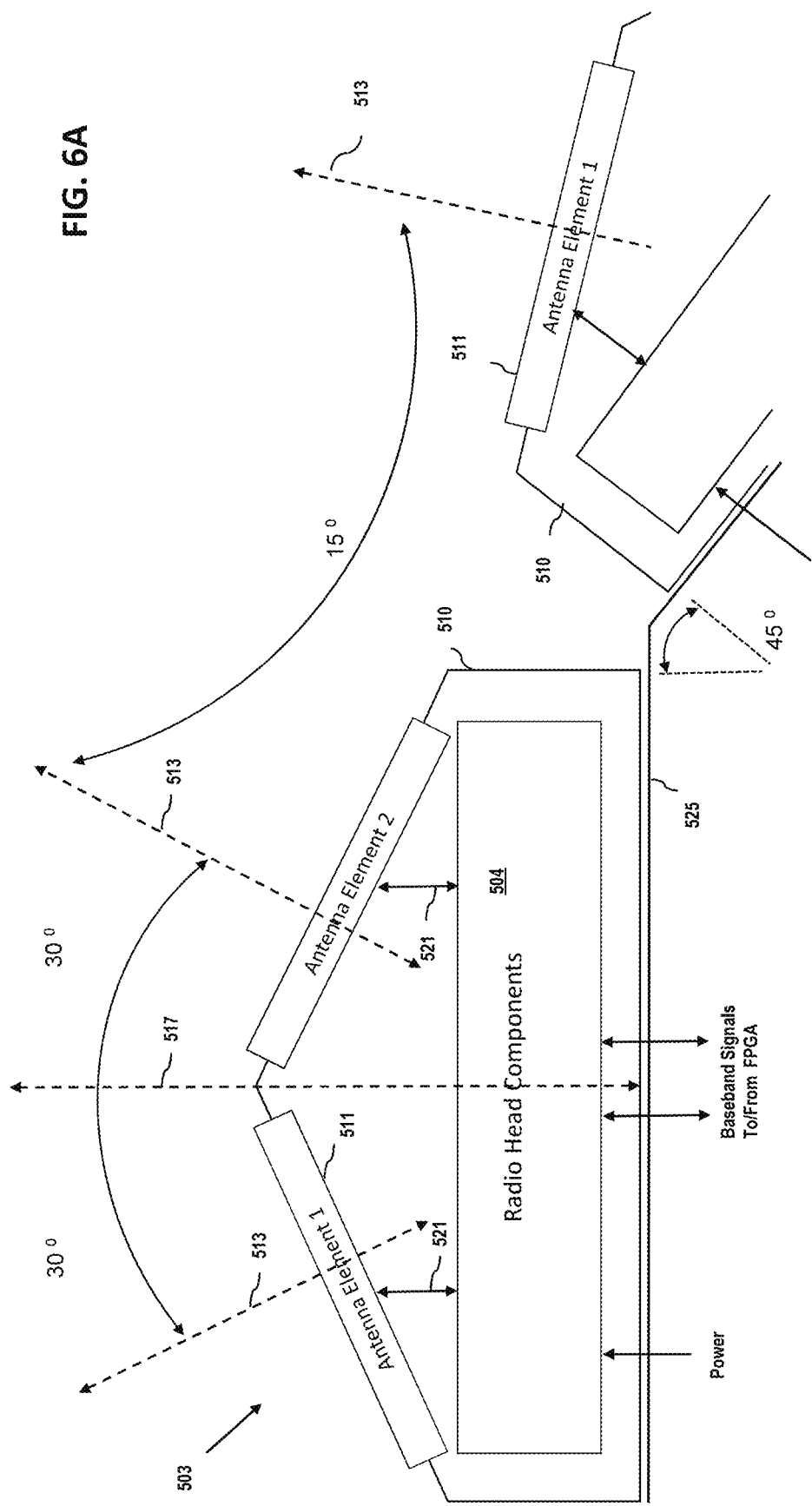

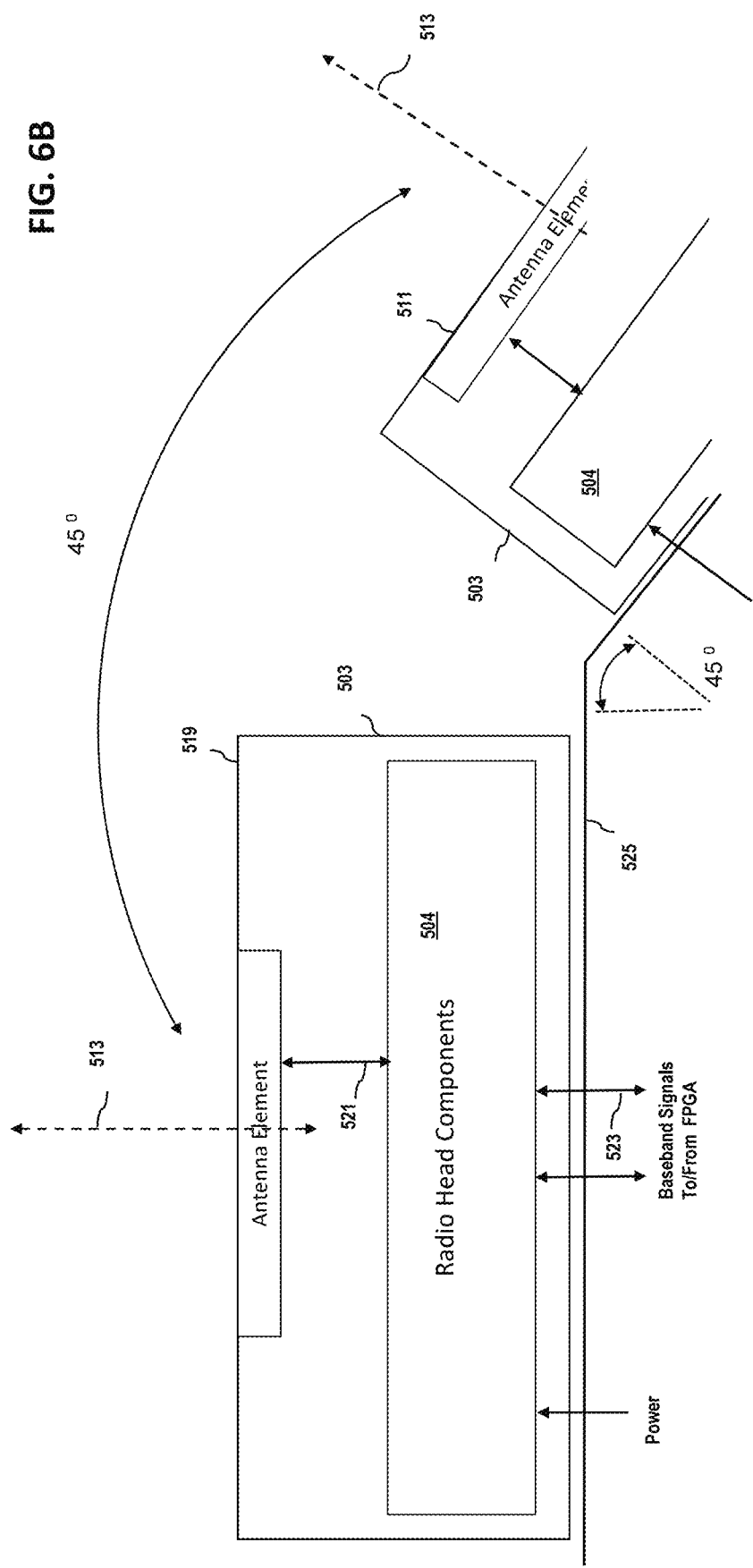

METHODS AND APPARATUS FOR RADIO CONFIGURATION IN A WIRELESS SYSTEM

RELATED APPLICATIONS

This application is generally related to the subject matter of co-owned and co-pending U.S. patent application Ser. No. 16/738,889 filed Jan. 9, 2020 and entitled "METHODS AND APPARATUS FOR SERVICE PROVISION TO OUT-OF-COVERAGE APPARATUS IN WIRELESS SYSTEMS", as well as U.S. patent application Ser. No. 16/676,188 filed Nov. 6, 2019 and entitled "METHODS AND APPARATUS FOR ENHANCING COVERAGE IN QUASI-LICENSED WIRELESS SYSTEMS," each of the foregoing incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The present disclosure relates generally to the field of wireless networks and specifically, in one or more exemplary embodiments, to methods and apparatus for configuration of a radio apparatus of a high-power wireless transceiver (e.g., Consumer Premises Equipment (CPE)), such as for example those providing connectivity via quasi-licensed technologies such as Citizens Broadband Radio Service (CBRS) technologies, Licensed Shared Access (LSA), TV White Space (TVWS), or Dynamic Spectrum Allocation (DSA).

2. Description of Related Technology

A multitude of wireless networking technologies, also known as Radio Access Technologies ("RATs"), provide the underlying means of connection for radio-based communication networks to user devices. Such RATs often utilize licensed radio frequency spectrum (i.e., that allocated by the FCC per the Table of Frequency Allocations as codified at Section 2.106 of the Commission's Rules. In the United States, regulatory responsibility for the radio spectrum is divided between the U.S. Federal Communications Commission (FCC) and the National Telecommunications and Information Administration (NTIA). The FCC, which is an independent regulatory agency, administers spectrum for non-Federal use (i.e., state, local government, commercial, private internal business, and personal use) and the NTIA, which is an operating unit of the Department of Commerce, administers spectrum for Federal use (e.g., use by the Army, the FAA, and the FBI). Currently only frequency bands between 9 kHz and 275 GHz have been allocated (i.e., designated for use by one or more terrestrial or space radio communication services or the radio astronomy service under specified conditions). For example, a typical cellular service provider might utilize spectrum for so-called "3G" (third generation) and "4G" (fourth generation) wireless communications as shown in Table 1 below:

TABLE 1

| Technology | Bands |
|---|---|
| 3G | 850 MHz Cellular, Band 5 (GSM/GPRS/EDGE). |
| | 1900 MHz PCS, Band 2 (GSM/GPRS/EDGE). |
| | 850 MHz Cellular, Band 5 (UMTS/HSPA + up to 21 Mbit/s). |
| | 1900 MHz PCS, Band 2 (UMTS/HSPA + up to 21 Mbit/s). |
| 4G | 700 MHz Lower B/C, Band 12/17 (LTE). |
| | 850 MHz Cellular, Band 5 (LTE). |
| | 1700/2100 MHz AWS, Band 4 (LTE). |
| | 1900 MHz PCS, Band 2 (LTE). |
| | 2300 MHz WCS, Band 30 (LTE). |

Alternatively, unlicensed spectrum may be utilized, such as that within the so-called ISM-bands. The ISM bands are defined by the ITU Radio Regulations (Article 5) in footnotes 5.138, 5.150, and 5.280 of the Radio Regulations. In the United States, uses of the ISM bands are governed by Part 18 of the Federal Communications Commission (FCC) rules, while Part 15 contains the rules for unlicensed communication devices, even those that share ISM frequencies. Table 2 below shows typical ISM frequency allocations:

TABLE 2

| Frequency range | Type | Center frequency | Availability | Licensed users |
|---|---|---|---|---|
| 6.765 MHz-6.795 MHz | A | 6.78 MHz | Subject to local acceptance | Fixed service & mobile service |
| 13.553 MHz-13.567 MHz | B | 13.56 MHz | Worldwide | Fixed & mobile services except aeronautical mobile (R) service |
| 26.957 MHz-27.283 MHz | B | 27.12 MHz | Worldwide | Fixed & mobile service except aeronautical mobile service, CB radio |
| 40.66 MHz-40.7 MHz | B | 40.68 MHz | Worldwide | Fixed, mobile services & earth exploration-satellite service |
| 433.05 MHz-434.79 MHz | A | 433.92 MHz | only in Region 1, subject to local acceptance | amateur service & radiolocation service, additional apply the provisions of footnote 5.280 |
| 902 MHz-928 MHz | B | 915 MHz | Region 2 only (with some exceptions) | Fixed, mobile except aeronautical mobile & radiolocation service; in Region 2 additional amateur service |
| 2.4 GHz-2.5 GHz | B | 2.45 GHz | Worldwide | Fixed, mobile, radiolocation, amateur & amateur-satellite service |
| 5.725 GHz - 5.875 GHz | B | 5.8 GHz | Worldwide | Fixed-satellite, radiolocation, mobile, amateur & amateur-satellite service |
| 24 GHz-24.25 GHz | B | 24.125 GHz | Worldwide | Amateur, amateur-satellite, radiolocation & earth exploration-satellite service (active) |
| 61 GHz-61.5 GHz | A | 61.25 GHz | Subject to local acceptance | Fixed, inter-satellite, mobile & radiolocation service |
| 122 GHz-123 GHz | A | 122.5 GHz | Subject to local acceptance | Earth exploration-satellite (passive), fixed, inter-satellite, mobile, |

TABLE 2-continued

| Frequency range | Type | Center frequency | Availability | Licensed users |
|---|---|---|---|---|
| 244 GHz–246 GHz | A | 245 GHz | Subject to local acceptance | space research (passive) & amateur service Radiolocation, radio astronomy, amateur & amateur-satellite service |

ISM bands have also been shared with (non-ISM) license-free communications applications such as wireless sensor networks in the 915 MHz and 2.450 GHz bands, as well as wireless LANs and cordless phones in the 915 MHz, 2.450 GHz, and 5.800 GHz bands.

Additionally, the 5 GHz band has been allocated for use by, e.g., WLAN equipment, as shown in Table 3:

TABLE 3

| Band Name | Frequency Band | Dynamic Freq. Selection Required (DFS)? |
|---|---|---|
| UNII-1 | 5.15 to 5.25 GHz | No |
| UNII-2 | 5.25 to 5.35 GHz | Yes |
| UNII-2 Extended | 5.47 to 5.725 GHz | Yes |
| UNII-3 | 5.725 to 5.825 GHz | No |

User client devices (e.g., smartphone, tablet, phablet, laptop, smartwatch, or other wireless-enabled devices, mobile or otherwise) generally support multiple RATs that enable the devices to connect to one another, or to networks (e.g., the Internet, intranets, or extranets), often including RATs associated with both licensed and unlicensed spectrum. In particular, wireless access to other networks by client devices is made possible by wireless technologies that utilize networked hardware, such as a wireless access point ("WAP" or "AP"), small cells, femtocells, or cellular towers, serviced by a backend or backhaul portion of service provider network (e.g., a cable network). A user may generally access the network at a "hotspot," a physical location at which the user may obtain access by connecting to modems, routers, APs, etc. that are within wireless range.

CBRS and Other "Shared Access" Systems—

In 2016, the FCC made available Citizens Broadband Radio Service (CBRS) spectrum in the 3550-3700 MHz (3.5 GHz) band, making 150 MHz of spectrum available for mobile broadband and other commercial users. The CBRS is unique, in that it makes available a comparatively large amount of spectrum (frequency bandwidth) without the need for expensive auctions, and without ties to a particular operator or service provider. Comparable technologies are in development, including for instance LSA, TVWS, and DSA.

Moreover, the CBRS spectrum is suitable for shared use between government and commercial interests, based on a system of existing "incumbents," including the Department of Defense (DoD) and fixed satellite services. Specifically, a three-tiered access framework for the 3.5 GHz is used; i.e., (i) an Incumbent Access tier 102, (ii) Priority Access tier 104, and (iii) General Authorized Access tier 106. See FIG. 1. The three tiers are coordinated through one or more dynamic Spectrum Access Systems (SAS) 202 as shown in FIG. 2 and Appendix I (including e.g., Band 48 therein).

Incumbent Access (existing DOD and satellite) users 102 include authorized federal and grandfathered Fixed Satellite Service (FSS) users currently operating in the 3.5 GHz band shown in FIG. 1. These users will be protected from harmful interference from Priority Access License (PAL) and General Authorized Access (GAA) users. The sensor networks, operated by Environmental Sensing Capability (ESC) operators, make sure that incumbents and others utilizing the spectrum are protected from interference.

The Priority Access tier 104 (including acquisition of spectrum for up to three years through an auction process) consists of Priority Access Licenses (PALs) that will be assigned using competitive bidding within the 3550-3650 MHz portion of the band. Each PAL is defined as a non-renewable authorization to use a 10 MHz channel in a single census tract for three years. Up to seven (7) total PALs may be assigned in any given census tract, with up to four PALs going to any single applicant. Applicants may acquire up to two-consecutive PAL terms in any given license area during the first auction.

The General Authorized Access tier 106 (for any user with an authorized 3.5 GHz device) is licensed-by-rule to permit open, flexible access to the band for the widest possible group of potential users. General Authorized Access (GAA) users 106 are permitted to use any portion of the 3550-3700 MHz band not assigned to a higher tier user and may also operate opportunistically on unused Priority Access License (PAL) channels. See FIG. 2A.

The FCC's three-tiered spectrum sharing architecture of FIG. 1 utilizes "fast-track" band (3550-3700 MHz) identified by PCAST and NTIA, while Tier 2 and 3 are regulated under a new Citizens Broadband Radio Service (CBRS). CBSDs (Citizens Broadband radio Service Devices—in effect, wireless access points or base stations) 206 (see FIG. 2) can only operate under authority of a centralized Spectrum Access System (SAS) 202. Rules are optimized for small-cell use, but also accommodate point-to-point and point-to-multipoint, especially in rural areas.

Under the FCC system, the standard SAS 202 includes the following elements: (1) CBSD registration; (2) interference analysis; (3) incumbent protection; (4) PAL license validation; (5) CBSD channel assignment; (6) CBSD power limits; (7) PAL protection; and (8) SAS-to-SAS coordination. As shown in FIG. 2, these functions are provided for by, inter alia, an incumbent detection (i.e., environmental sensing) function 207 configured to detect use by incumbents, and an incumbent information function 209 configured to inform the incumbent when use by another user occurs. An FCC database 211 is also provided, such as for PAL license validation, CBSD registration, and other functions.

An optional Domain Proxy (DP) 208 is also provided for in the FCC architecture. Each DP 208 includes: (1) SAS interface GW including security; (2) directive translation between CBSD 206 and domain commands; (3) bulk CBSD directive processing; and (4) interference contribution reporting to the SAS.

A domain is defined as any collection of CBSDs 206 that need to be grouped for management; e.g., large enterprises, venues, stadiums, train stations, etc. Domains can be even larger/broader in scope, such as for example a terrestrial operator network. Moreover, domains may or may not use private addressing. A Domain Proxy (DP) 208 can aggregate control information flows to other SAS, such as e.g., a Commercial SAS (CSAS, not shown), and generate performance reports, channel requests, heartbeats, etc.

CBSDs 206 can generally be categorized as either Category A or Category B. Category A CBSDs have an EIRP or Equivalent Isotropic Radiated Power of 30 dBm (1 Watt)/10 MHz, fixed indoor or outdoor location (with an antenna <6m in length if outdoor). Category B CBSDs have 47 dBm EIRP (50 Watts)/10 MHz, and fixed outdoor location only. Professional installation of Category B CBSDs is required, and the antenna must be less than 6m in length. All CBSD's have a vertical positioning accuracy requirement of +/−3m. Terminals (i.e., user devices akin to UE) have 23 dBm EIRP (0.2 Watts)/10 MHz requirements, and mobility of the terminals is allowed.

In terms of spectral access, CBRS utilizes a time division duplex (TDD) multiple access architecture.

Unaddressed Issues of Device Operational State and Configuration—

With increasing demand for coverage by broadband networking services, such as those delivered via use of CBRS spectrum, there is an increasing amount of wireless equipment that is being deployed for servicing such demand. One way in which broadband wireless services are provided, including at network edges (e.g., in rural areas), is by use of Fixed Wireless Access (FWA) devices. A high-level diagram showing a typical FWA device installation is shown in FIG. 3.

With greater infrastructure deployment such as the FWA device of FIG. 3, service providers are faced with a growing amount of overhead not only to maintain the deployed equipment, but also to continuously monitor and address any issues that arise relating to such equipment, for example relating to non-optimal performance of the installed equipment, service outages, component failures, etc. Furthermore, network, environmental, and operational conditions surrounding a given Consumer Premises Equipment (CPE) installation may frequently change for various reasons, such as removal or addition of new base stations 302 (as shown in FIG. 4) or addition of new CPE nearby (each of which can adversely affect interference experienced by the given CPE installation), and changes in RF signal propagation and losses due to e.g., addition or movement of structures such as buildings, cellular infrastructure, billboards, etc. These changes in the environment of the deployed CPE have traditionally necessitated "truck rolls" for equipment adjustment, tuning, re-installation, update, and/or troubleshooting.

With more equipment being deployed, additional resources must be spent to address and respond to such changes, especially those which negatively impact the user's "experience." Long-term customer loyalty may also be adversely affected; even if such servicing or "truck rolls" are highly effective at mitigating or remedying the issues which crop up, they none-the-less devalue the service providers quality in the eyes of their customers, since unnecessary time, effort, and frustration are expended by the customers through the issue discovery/contact/resolution cycle necessitated by such scenarios.

As a brief aside, CPE antenna types currently in use are typically of the omni-directional or directional type, and the exterior portion of the CPE is usually installed at an optimum location on the rooftop or façade of a building so as to enable communication with a serving device such as a base station. Once installed, the positioning of current exterior CPE apparatus remains static, unless they are physically moved or re-aligned such as due to re-installation or maintenance, or natural forces such as high winds, tree limb damage, etc. As such, to remedy any significant reduction or loss of signal strength between the CPE and the serving base station (due to any cause) necessarily requires a truck roll (e.g., to re-install or re-orient the external CPE apparatus so that they can be put in better signal communication with the same or another base station). As discussed supra, these truck rolls are very expensive in terms of MSO resources, and necessarily involve a great deal of latency (and hence user frustration).

Moreover, non-optimal levels of networking service are often observed at the network edges of coverage (such as in rural areas), which similarly require truck rolls and associated cost/latency. For example, conventional directional or omni-directional CPE antennae at a cell edge will not, e.g., in poor RF conditions, be able to meet the prevailing SLA (service level agreement) requirements on a continuous basis. In some such cases, a given CPE's performance may vary (including to levels below SLA) as a function of RF conditions—which may be highly unpredictable and/or change with time—thereby further adding to customer frustration.

One feasible work-around would be to utilize a directional antenna with wider beam width or dispersion of the RF signal, either on the transmitter side and/or the receiver side, so as to in effect focus and capture more relevant RF energy and compensate for any antenna misalignment or other confounding artifacts. However, use of wider beam-width (including in the limiting case omni-directional propagation) may also cause further interference with other CPEs and base stations, especially in more densely packed use cases.

In high density environments, the CPE may also experience significant interference from the other users operating in the same frequency band or an adjacent band. Hence, the CPE may feasibly try to increase its EIRP in order to compensate for the interference, as well as path losses. However, with use of a quasi-licensed wireless system such as CBRS and the like, the CPE is capped at a comparatively low power level (e.g., EIRP no greater than 23 dBm for e.g., CBRS as discussed previously), and hence "more signal" on the CPE side is not a viable answer. Likewise, higher power by the CBSD may create additional interference for other CPE.

Accordingly, there is a need for improved methods and apparatus enabling dynamic configuration of wireless devices such as CBRS FWA operating within a wireless network, in order to compensate for non-optimal network or RF conditions, antennae misalignment, high levels of RF interference, or other such conditions which might otherwise necessitate service provider intervention, such as via truck-rolls (and their associated high cost and inefficiency). Ideally, these improved methods and apparatus would, inter alia, enable network providers and operators to provide dynamic adjustment of the configuration of various equipment in a time-sensitive fashion and with greater efficiency, and reduce the amount of resources required to maintain and/or achieve a desired level of service.

SUMMARY

The present disclosure addresses the foregoing needs by providing, inter alia, methods and apparatus for configuration of a wireless device (such as e.g., a CBRS CPE/FWA device or another similar device) in a wireless network.

In a first aspect of the disclosure, a computerized apparatus for configuring a wireless device in a wireless network is disclosed. In one embodiment, the computerized device includes digital processing apparatus; network interface apparatus in data communication with the digital processing apparatus; radio apparatus in data communication with the digital processing apparatus; and a storage device in data communication with the digital processing apparatus.

In one variant, the storage device includes a storage medium having at least one computer program configured to, when executed on the digital processing apparatus, cause the computerized apparatus to: identify one or more wireless networks in range of the wireless device; detect data relating to one or more network conditions of the one or more wireless networks; store the detected data; and change configuration of the radio apparatus based at least on evaluation of the detected data.

In another variant, the computerized apparatus further includes a programmable logic device (PLD). In one variant, the PLD includes an FPGA (field programmable gate array). In another variant, the PLC includes a reconfigurable processor array such as an array of DSPs, GPUs, or RISC cores.

In further another variant, the radio apparatus includes an array of two or more sectorized antenna elements and associated individual radio heads. In one implementation, eight (8) separate antenna elements are utilized. In another implementation, sixteen (16) separate antenna elements are utilized. In other variants, the array includes a number N of elements, only M of which are utilized at a given time.

In yet another variant, the radio apparatus includes an array of narrow-beam antenna elements.

In still another variant, the at least one computer program is further configured to: receive, via the network interface apparatus, data relating to one or more rules for determination of which one of the one or more wireless networks for the computerized apparatus to connect to; and store the received data for subsequent use.

In another variant, the received data relating to the one or more rules comprise computerized logic that utilizes the stored data relating to the one or more network conditions of the one or more wireless networks.

In another variant, the change of the configuration of the radio apparatus is performed dynamically by the computerized apparatus based on the stored another data relating to the one or more rules.

In still another variant, the change of the configuration of the radio apparatus is instigated by transmission of a command for activating or de-activating at least one portion of the radio apparatus.

In another aspect, a configurable computerized wireless device for use in a wireless network is disclosed. In one embodiment, the computerized wireless device includes: programmable logic array apparatus comprising a plurality of configurable logic elements; and a plurality of radio apparatus in data communication with the programmable logic array apparatus. The programmable logic array apparatus includes logic configured to, when executed: identify one or more wireless network apparatus communicative with the computerized wireless device via one or more of the plurality of radio apparatus; obtain data relating to one or more network conditions associated with each of the one or more wireless network apparatus; store the obtained data; and change configuration of at least one of the plurality of radio apparatus based at least on the obtained data.

In one variant, the programmable logic array apparatus includes a field programmable gate array apparatus comprising a plurality of preconfigured logic blocks; and the radio apparatus each comprise transceiver apparatus compliant with 3GPP (Third Generation Partnership Project) Long Term Evolution or 5G New Radio protocols and are configured to operate in at least one quasi-licensed frequency band.

In one implementation, the configurable wireless device includes part of a Citizens Broadband Radio Service (CBRS) Fixed Wireless Access (FWA) device; and the at least one quasi-licensed frequency band includes a CBRS band between 3.550 and 3.70 GHz, and the at least one quasi-licensed frequency band is assigned to the FWA device by a network spectrum allocation device.

In another variant, each of the radio apparatus comprise one or more antenna elements comprise a beam width or dispersion less than or equal to a prescribed amount. In one implementation thereof, the configurable wireless device includes a structure having an equilateral geometric shape, with at least one of the one or more plurality of antenna elements associated with each of a respective facet of the structure; and the prescribed amount includes an amount such that an amount of beam overlap between two antenna elements of adjacent ones of the radio apparatus includes approximately thirty percent (30%).

In another implementation, the configurable wireless device includes logic which is configured to, when executed, cause establishment of simultaneous wireless connections via at least two of the plurality of radio apparatus with respective ones of different network apparatus; and the wireless device further includes logic configured to enable aggregation or disaggregation of packets associated with a common application of the wireless device from or to the at least two wireless connections, respectively.

In one particular configuration, the aggregation or disaggregation of packets associated with a common application of the wireless device from or to the at least two wireless connections, respectively includes aggregation or disaggregation via a transport layer protocol operative to execute on a processing device of the configurable wireless device.

In a further variant, the programmable logic array apparatus includes logic configured to utilize data relating to one or more rules for determination of which one of the one or more wireless network apparatus to connect, the determination based at least in part on the obtained data.

In yet another variant, the programmable logic array apparatus includes logic configured to: cause transmission of the obtained data to a network-based computerized process via at least one of radio apparatus and a wireless network apparatus in wireless communication therewith according to an existing configuration; and utilize data received from the network-based computerized process to implement a change or modification to the existing configuration, the change or modification comprising at least utilization of a different subset of the plurality of radio apparatus for wireless communication to or from the configurable wireless device.

In another aspect of the disclosure, integrated circuit (IC) apparatus for configuring a wireless device having a plurality of radio apparatus is described. In one embodiment, the IC apparatus includes: one or more first configurable logic blocks (CLBs), the CLBs configured for data communication with one or more of the plurality of radio apparatus via one or more input and output (I/O) contacts; one or more second CLBs comprising performance monitoring logic, the performance monitoring logic in data communication with at least a portion of the one or more first CLBs and configured to determine at least one performance parameter associated with wireless connections between the one or more radio apparatus and one or more respective serving base stations; and one or more third CLBs comprising decision making logic, the one or more third CLBs in data communication with the one or more second CLBs and configured to utilize at least the determined at least one performance parameter for respective ones of the wireless connections to decide which of the plurality of radio apparatus to utilize for subsequent operations of the wireless device.

In one variant, one or more of the one or more first or second CLBs are configured to perform at least one of (i)

packet aggregation, or (ii) network congestion control, for data packets exchanged between the wireless device and respective base stations via two or more of said wireless connections.

In another variant, the IC includes an FPGA having at least one processor core, with the CLBs being logically inter-connectable via at least one of a switching fabric or switch matrix.

In another aspect of the disclosure, a computerized method for operating a wireless device within a wireless network having a plurality of base stations is described. In one embodiment, the wireless device includes a plurality of radio apparatus disposed at varying azimuth angles, and the computerized method includes: detecting a first connectable base station; obtaining, using at least a portion of the plurality of radio apparatus of the wireless device, data relating to one or more network conditions associated with the first connectable base station; storing the obtained data; repeating the detecting, obtaining and storing for at least a second of the plurality of base stations; evaluating the stored obtained data; and establishing a configuration of the wireless device based at least on the evaluating the stored obtained data for the first and at least second base stations, the configuration comprising selection of one or more of the radio apparatus and one or more of the plurality of base stations between which to establish wireless connections for provision of broadband wireless service via the wireless device.

In one variant, the obtaining the first connectable base station includes identifying the first connectable base station via logic operative on one or more configurable logic blocks (CLBs) of a logic array of the wireless device, the obtained data relating to one or more radio frequency (RF) parameters associated with RF transmissions by the first base station.

In another variant, the detecting includes detecting the first base station utilizing 3GPP protocols for detection within a CBRS frequency band within which the first base station is operating as a CBSD, the wireless device configured to scan the CBRS frequency band.

In yet a further variant, the method further includes establishing a wireless connection with each of the first and at least one second connectable base stations. The obtaining data in one implementation includes using a performance client process operative to execute on the wireless device to obtain at least one of throughput, latency, jitter, or BER (bit error rate) data for the connections.

In another implementation, the establishing a configuration includes: selecting two of the one or more of the established wireless connections to provide multi-path service for a common application operative on the wireless device, the multi-path service utilizing a plurality of CLBs of a logic array apparatus of the wireless device.

In yet another aspect of the disclosure, a computerized method for determining whether a threshold level of network conditions for connection is achieved is disclosed.

In another aspect of the disclosure, a database for maintaining data relating to network conditions and infrastructure surrounding a CPE is disclosed.

In still another aspect of the disclosure, a computerized method for selectively using individual ones of an array of radio apparatus is disclosed.

In yet another aspect of the disclosure, a computerized method for adding, modifying, and/or maintaining data relating to Service Level Agreement (SLA) is disclosed.

In a further aspect of the disclosure, a computerized method for maximizing network performance of a wireless device is disclosed. In one variant, the method includes mitigating interference via selective use of one or more specific radio apparatus and corresponding narrow beamwidth antenna elements.

In another aspect of the disclosure, a computerized method for detecting performance degradation of a wireless network is disclosed.

In still another aspect of the disclosure, a computerized method for packet aggregation of data exchanged over one or more radio apparatus of a wireless device is disclosed. In one variant, a plurality of CLBs of an FPGA are utilized to perform the packet aggregation, thereby offloading baseband or CPU processing assets and reducing latency.

In a further aspect of the disclosure, a computerized method for congestion control of data exchanged over one or more radio apparatuses of a wireless device is disclosed.

In another aspect, methods and apparatus for utilizing two or more individual radio apparatus to form an aggregated or composite wireless link is disclosed. In one variant, two individual radio apparatus of the same CPE/FWA form respective connections with one or more serving CBSDs (or other CPE/FWA acting as CBSDs for out-of-coverage or relay/supplementation of signal from an xNB/CBSD), allowing enhanced data rate and throughput.

In another aspect, a remotely configurable CPE for use in a wireless network is disclosed. In one embodiment, the CPE includes a plurality of logic blocks which can be selectively utilized or not utilized, and reconfigured relative to a plurality of radio apparatus of the CPE.

These and other aspects shall become apparent when considered in light of the disclosure provided herein.

BRIEF DESCRIPTION OF THE DRAWINGS

FIG. 5D is a graphical illustration representing an exemplary data structure for maintaining data relating to one or more network conditions/nodes, useful with various aspects of the present disclosure.

FIG. 6A is a plan view of one embodiment of the external portion of the CPE apparatus of FIG. 5 (multiple antenna elements per radio), illustrating the various components and exemplary angular relationships.

FIG. 6B is a plan view of another embodiment of the external portion of the CPE apparatus of FIG. 5A (one antenna element per radio), illustrating the various components and exemplary angular relationships.

Figure 1:
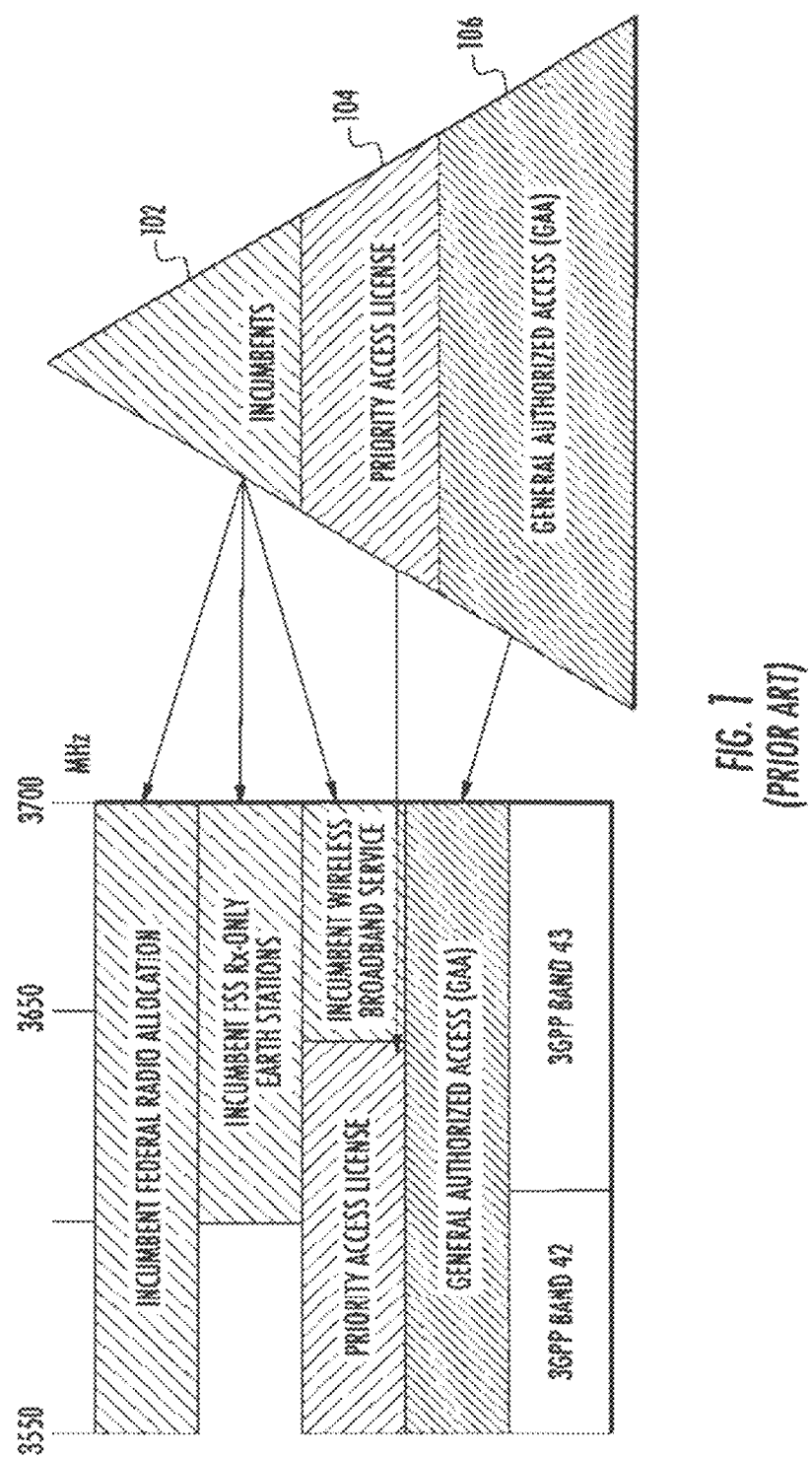
FIG. 1 is a graphical illustration of prior art CBRS (Citizens Broadband Radio Service) users and their relationship to allocated frequency spectrum in the 3.550 to 3.700 GHz band.
Figure 2:
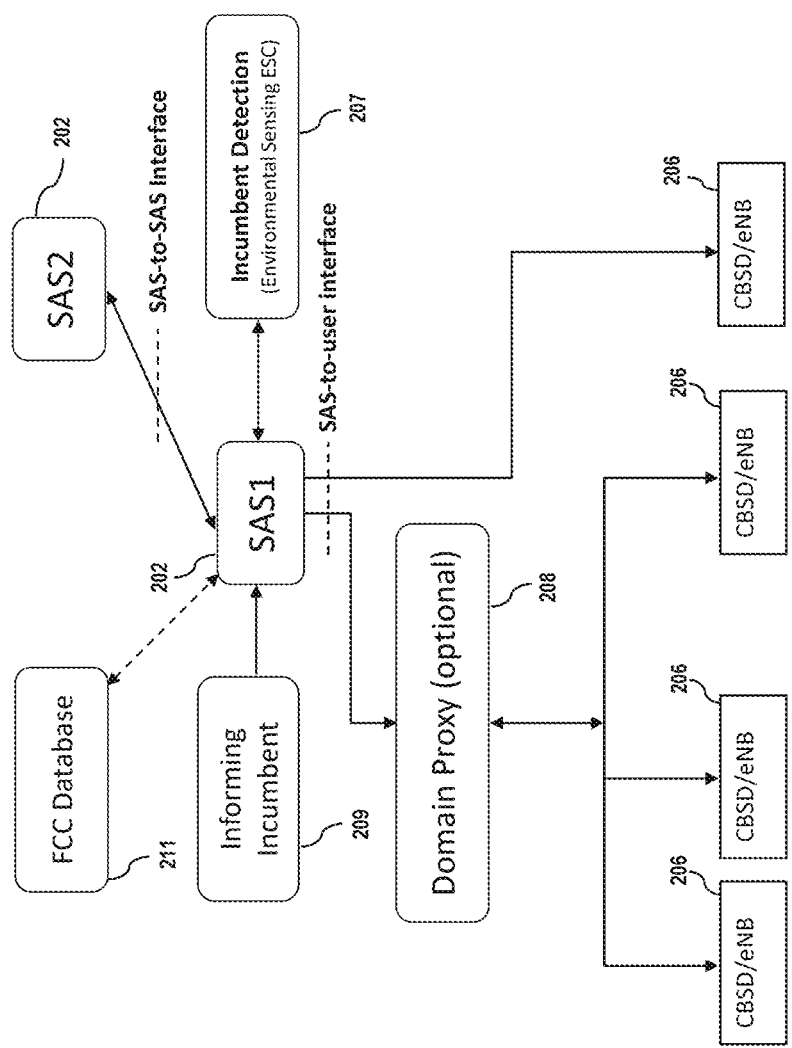
FIG. 2 is a logical block diagram illustrating a general architecture for the CBRS system of the prior art.
Figure 2A:
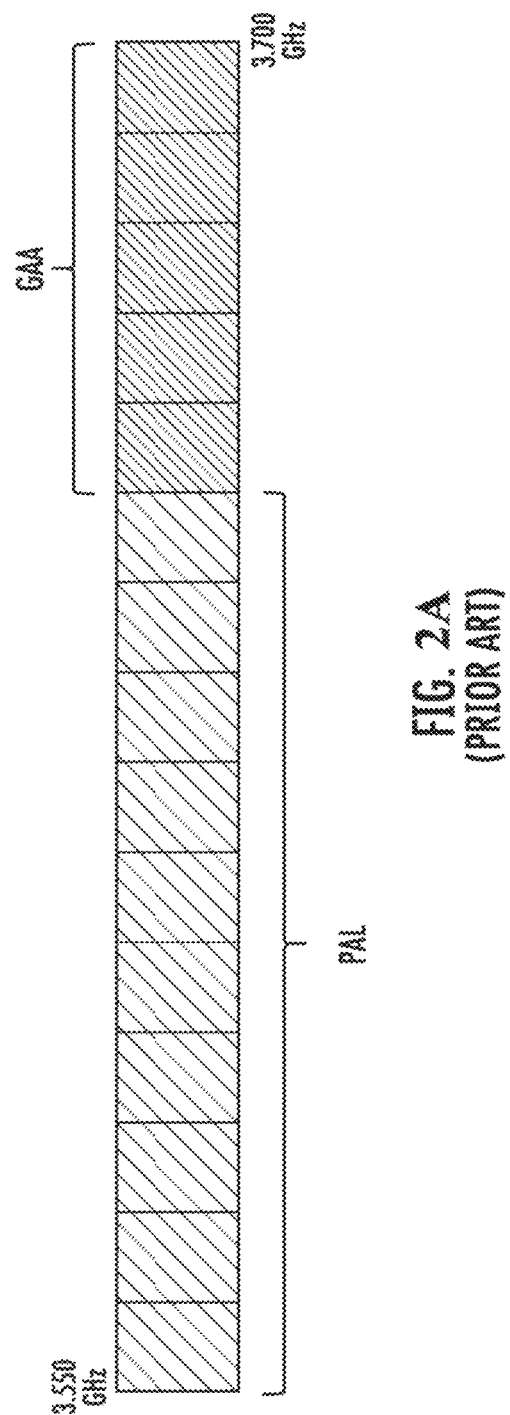
FIG. 2A is a graphical representation of allocations for PAL versus GAA users within the frequency band of FIG. 2.

All Figures © Copyright 2019-2020 Charter Communications Operating, LLC. All rights reserved.

DETAILED DESCRIPTION

Reference is now made to the drawings wherein like numerals refer to like parts throughout.

As used herein, the term "access node" refers generally and without limitation to a network node which enables communication between a user or client device and another entity within a network, such as for example a CBRS CBSD, or a cellular xNB.

As used herein, the term "application" (or "app") refers generally and without limitation to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could include a downloadable Java Xlet™ that runs within the JavaTV™ environment.

As used herein, the term "CBRS" refers without limitation to the CBRS architecture and protocols described in *Signaling Protocols and Procedures for Citizens Broadband Radio Service (CBRS): Spectrum Access System (SAS)—Citizens Broadband Radio Service Device (CBSD) Interface Technical Specification*—Document WINNF-TS-0016, Version V1.2.1. 3, January 2018, incorporated herein by reference in its entirety, and any related documents or subsequent versions thereof.

As used herein, the terms "client device" or "user device" or "UE" include, but are not limited to, set-top boxes (e.g., DSTBs), gateways, modems, personal computers (PCs), and minicomputers, whether desktop, laptop, or otherwise, and mobile devices such as handheld computers, PDAs, personal media devices (PMDs), tablets, "phablets", smartphones, and vehicle infotainment systems or portions thereof.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.) and the like.

As used herein, the term "DOCSIS" refers to any of the existing or planned variants of the Data Over Cable Services Interface Specification, including for example DOCSIS versions 1.0, 1.1, 2.0, 3.0, 3.1 and 4.0.

As used herein, the term "headend" or "backend" refers generally to a networked system controlled by an operator (e.g., an MSO) that distributes programming to MSO clientele using client devices. Such programming may include literally any information source/receiver including, inter alia, free-to-air TV channels, pay TV channels, interactive TV, over-the-top services, streaming services, and the Internet.

As used herein, the terms "Internet" and "internet" are used interchangeably to refer to inter-networks including, without limitation, the Internet. Other common examples include but are not limited to: a network of external servers, "cloud" entities (such as memory or storage not local to a device, storage generally accessible at any time via a network connection, and the like), service nodes, access points, controller devices, client devices, etc.

As used herein, the term "LTE" refers to, without limitation and as applicable, any of the variants or Releases of the Long-Term Evolution wireless communication standard, including LTE-U (Long Term Evolution in unlicensed spectrum), LTE-LAA (Long Term Evolution, Licensed Assisted Access), LTE-A (LTE Advanced), and 4G/4.5G LTE.

As used herein, the term "memory" includes any type of integrated circuit or other storage device adapted for storing digital data including, without limitation, ROM, PROM, EEPROM, DRAM, SDRAM, DDR/2 SDRAM, EDO/FPMS, RLDRAM, SRAM, "flash" memory (e.g., NAND/NOR), 3D memory, and PSRAM.

As used herein, the terms "microprocessor" and "processor" or "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable computer fabrics (RCFs), array processors, secure microprocessors, and application-specific integrated circuits (ASICs). Such digital processors may be contained on a single unitary IC die, or distributed across multiple components.

As used herein, the terms "MSO" or "multiple systems operator" refer to a cable, satellite, or terrestrial network provider having infrastructure required to deliver services including programming and data over those mediums.

As used herein, the terms "MNO" or "mobile network operator" refer to a cellular, satellite phone, WMAN (e.g., 802.16), or other network service provider having infrastructure required to deliver services including without limitation voice and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, LTE/LTE-A/LTE-U/LTE-LAA, 5G NR, WAP, SIP, UDP, FTP, RTP/RTCP, H.323, etc.).

As used herein, the term "network interface" refers to any signal or data interface with a component or network including, without limitation, those of the FireWire (e.g., FW400, FW800, etc.), USB (e.g., USB 2.0, 3.0. OTG), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), LTE/LTE-A/LTE-U/LTE-LAA, Wi-Fi (802.11), WiMAX (802.16), Z-wave, PAN (e.g., 802.15), or power line carrier (PLC) families.

As used herein the terms "5G" and "New Radio (NR)" refer without limitation to apparatus, methods or systems compliant with 3GPP Release 15, and any modifications, subsequent Releases, or amendments or supplements thereto which are directed to New Radio technology, whether licensed or unlicensed.

As used herein, the term "QAM" refers to modulation schemes used for sending signals over e.g., cable or other networks. Such modulation scheme might use any constellation level (e.g. QPSK, 16-QAM, 64-QAM, 256-QAM, etc.) depending on details of a network. A QAM may also refer to a physical channel modulated according to the schemes.

As used herein, the term "quasi-licensed" refers without limitation to spectrum which is at least temporarily granted, shared, or allocated for use on a dynamic or variable basis, whether such spectrum is unlicensed, shared, licensed, or otherwise. Examples of quasi-licensed spectrum include without limitation CBRS, DSA, GOGEU TVWS (TV White Space), and LSA (Licensed Shared Access) spectrum.

As used herein, the term "SAE (Spectrum Allocation Entity)" refers without limitation to one or more entities or processes which are tasked with or function to allocate quasi-licensed spectrum to users. Examples of SAEs include SAS (CBRS). PMSE management entities, and LSA Controllers or Repositories.

As used herein, the term "SAS (Spectrum Access System)" refers without limitation to one or more SAS entities which may be compliant with FCC Part 96 rules and certified for such purpose, including (i) Federal SAS (FSAS), (ii) Commercial SAS (e.g., those operated by private companies or entities), and (iii) other forms of SAS.

As used herein, the term "server" refers to any computerized component, system or entity regardless of form which is adapted to provide data, files, applications, content, or other services to one or more other devices or entities on a computer network.

As used herein, the term "shared access" refers without limitation to (i) coordinated, licensed sharing such as e.g., traditional fixed link coordination in 70/80/90 GHz and the U.S. FCC's current rulemaking on potential database-coordinated sharing by fixed point-to-multipoint deployments in the C-band (3.7-4.2 GHz); (ii) opportunistic, unlicensed use of unused spectrum by frequency and location such as TV White Space and the U.S. FCC's proposal to authorize unlicensed sharing in the uplink C-band and other bands between 5925 and 7125 MHz; (iii) two-tier Licensed Shared Access (LSA) based on geographic areas and database assist such as e.g., within 3GPP LTE band 40 based on multi-year sharing contracts with tier-one incumbents; and (iv) three-tier shared access (including quasi-licensed uses) such as CBRS.

As used herein, the term "storage" refers to without limitation computer hard drives, DVR device, memory, RAID devices or arrays, optical media (e.g., CD-ROMs, Laserdiscs, Blu-Ray, etc.), or any other devices or media capable of storing content or other information.

As used herein, the term "users" may include without limitation end users (e.g., individuals, whether subscribers of the MSO network, the MNO network, or other), the receiving and distribution equipment or infrastructure such as a FWA/CPE or CBSD, venue operators, third party service providers, or even entities within the MSO itself (e.g., a particular department, system or processing entity).

As used herein, the term "Wi-Fi" refers to, without limitation and as applicable, any of the variants of IEEE Std. 802.11 or related standards including 802.11 a/b/g/n/s/v/ac or 802.11-2012/2013, 802.11-2016, as well as Wi-Fi Direct (including inter alia, the "Wi-Fi Peer-to-Peer (P2P) Specification", incorporated herein by reference in its entirety).

As used herein, the term "wireless" means any wireless signal, data, communication, or other interface including without limitation Wi-Fi, Bluetooth/BLE, 3G (3GPP/3GPP2), HSDPA/HSUPA, TDMA, CBRS, CDMA (e.g., IS-95A, WCDMA, etc.), FHSS, DSSS, GSM, PAN/802.15, WiMAX (802.16), 802.20, Zigbee®, Z-wave, narrowband/FDMA, OFDM, PCS/DCS, LTE/LTE-A/LTE-U/LTE-LAA, 5G NR, LoRa, IoT-NB, SigFox, analog cellular, CDPD, satellite systems, millimeter wave or microwave systems, acoustic, and infrared (i.e., IrDA).

As used herein, the term "xNB" refers to any 3GPP-compliant node including without limitation eNBs (eUTRAN) and gNBs (5G NR).

Overview

In one salient aspect of the present disclosure, configurable CPE apparatus and methods for operating and configuring the same are provided. In one embodiment, the CPE apparatus includes a plurality of radio apparatus (e.g., radio "heads" with associated narrow-dispersion beam antenna elements) and associated reconfigurable logic controller elements, such that each radio apparatus can be controlled individually as well as two or more being controlled collectively.

In one implementation, the CPE apparatus is an FWA device and utilizes quasi-licensed wireless spectrum (CBRS). The reconfigurable logic controller is implemented as an FPGA or similar with a plurality of logic blocks or elements for particular logic functions including link performance analysis, packet aggregation, and/or congestion control.

In one variant, each radio apparatus has a sectorized antenna with a narrow beam dispersion. An array of sectorized antennae can provide a 360-degree coverage, and each antenna can be activated and/or de-activated individually so that not all antennae have to be activated or de-activated together. These radio apparatus can be configured to run as data throughput as well as spectrum analyzers, to scan the network for interference, characterize the radio frequency environment, and obtain key performance indexes (KPIs) such as throughput (e.g., data rate in Mbps), latency, jitter, etc.

Electronic beamforming is also used in certain embodiments as a complement to radio/antenna element selection, so as to more narrowly steer certain transmit/receive beams associated with the array so as to, among other things, minimize inter-radio and/or inter-CPE interference.

In another variant, a configurable logical device such as FPGA, CPLD, etc. can be used to implement the radio controller and other elements of the wireless device. In this variant, one or more configurable logic blocks (CLBs) can be used as transceivers connected to radio antennae via input and output (I/O) contacts. The one or more CLBs can operate in parallel to reduce system latency and/or achieve higher throughput.

In yet another variant, a database is implemented on a storage medium associated with the wireless device to store the obtained KPIs or spectrum data (including associations to detected base stations relevant to the CPE); this database is used by logic operative to run on a "decision maker" CLB to make selections of radios and base stations which enable the CPE to meet its prevailing SLA requirements (including through use of two or more individual radio connections aggregated), yet avoid undue interference to other CPE and base stations by virtue of tightly controlled/selected narrow beams.

In a further variant, one or more of the CLBs can be configured for packet aggregation of the data exchanged via one or more radio apparatus, such as in the aforementioned multi-connection scenarios.

Notably, by providing a highly configurable system of radios, a given CPE can be operated and maintained remotely (or even autonomously, such as by logic intrinsic on the FPGA or other portions of the CPE itself alone) at any time without requiring physical access by e.g., MSO technical personnel, thereby reducing truck rolls (resulting in a cost savings and increased efficiency in maintaining the CPE), as well as service optimization for customers (including dynamic adaptation to changing RF, topological, or operational conditions).

The methods and apparatus described herein can also advantageously be extended to other shared-access architectures (i.e., other than CBRS) such as for example DSA, LSA, and TVWS systems, as well as those utilizing (fully) licensed and/or unlicensed RF spectrum.

DETAILED DESCRIPTION OF EXEMPLARY EMBODIMENTS

Exemplary embodiments of the methods and apparatus of the present disclosure are now described in detail. While these exemplary embodiments are described in the context of the previously mentioned wireless access points (e.g., CBSDs) associated with e.g., a managed network (e.g., hybrid fiber coax (HFC) cable architecture having a multiple systems operator (MSO), digital networking capability, IP delivery capability, and a plurality of client devices), the general principles and advantages of the disclosure may be extended to other types of radio access technologies ("RATs"), networks and architectures that are configured to deliver digital data (e.g., text, images, games, software applications, video and/or audio). Such other networks or architectures may be broadband, narrowband, or otherwise, the following therefore being merely exemplary in nature.

It will also be appreciated that while described generally in the context of a network providing service to a customer or consumer or end user or subscriber (i.e., within a prescribed venue, or other type of premises), the present disclosure may be readily adapted to other types of environments including, e.g., outdoors, commercial/retail, or enterprise domain (e.g., businesses), or even governmental uses, such as those outside the proscribed "incumbent" users such as U.S. DoD and the like. Yet other applications are possible.

Also, while certain aspects are described primarily in the context of the well-known Internet Protocol (described in, inter alia, *Internet Protocol DARPA Internet Program Protocol Specification*, IETF RCF 791 (September 1981) and Deering et al., *Internet Protocol, Version 6 (IPv6) Specification*, IETF RFC 2460 (December 1998), each of which is incorporated herein by reference in its entirety), it will be appreciated that the present disclosure may utilize other types of protocols (and in fact bearer networks to include other internets and intranets) to implement the described functionality.

Moreover, while the current SAS framework is configured to allocate spectrum in the 3.5 GHz band (specifically 3,550 to 3,700 MHz), it will be appreciated by those of ordinary skill when provided the present disclosure that the methods and apparatus described herein may be configured to utilize other "quasi-licensed" systems or other spectrum, including without limitation DSA, LSA, or TVWS systems, and those above 4.0 GHz (e.g., currently proposed allocations up to 4.2 GHz, and even millimeter wave bands such as those between 24 and 100 GHz).

Additionally, while described primarily in terms of GAA 106 spectrum allocation (see FIG. 1), the methods and apparatus described herein may also be adapted for allocation of other "tiers" of CBRS or other unlicensed spectrum (whether in relation to GAA spectrum, or independently), including without limitation e.g., so-called Priority Access License (PAL) spectrum 104.

Moreover, while described in the context of quasi-licensed or unlicensed spectrum, it will be appreciated by those of ordinary skill given the present disclosure that various of the methods and apparatus described herein may be applied to reallocation/reassignment of spectrum or bandwidth within a licensed spectrum context; e.g., for cellular voice or data bandwidth/spectrum allocation, such as in cases where a given service provider must alter its current allocation of available spectrum to users.

Further, while some aspects of the present disclosure are described in detail with respect to so-called "4G/4.5G" 3GPP Standards (aka LTE/LTE-A) and so-called 5G "New Radio" (3GPP Release 15 and TS 38.XXX Series Standards and beyond), such aspects—including allocation/use/withdrawal of CBRS spectrum—are generally access technology "agnostic" and hence may be used across different access technologies, and can be applied to, inter alia, any type of P2MP (point-to-multipoint) or MP2P (multipoint-to-point) technology, including e.g., Qualcomm Multefire.

Other features and advantages of the present disclosure will immediately be recognized by persons of ordinary skill in the art with reference to the attached drawings and detailed description of exemplary embodiments as given below.

Exemplary CPE Antenna Module—

Figure 5:
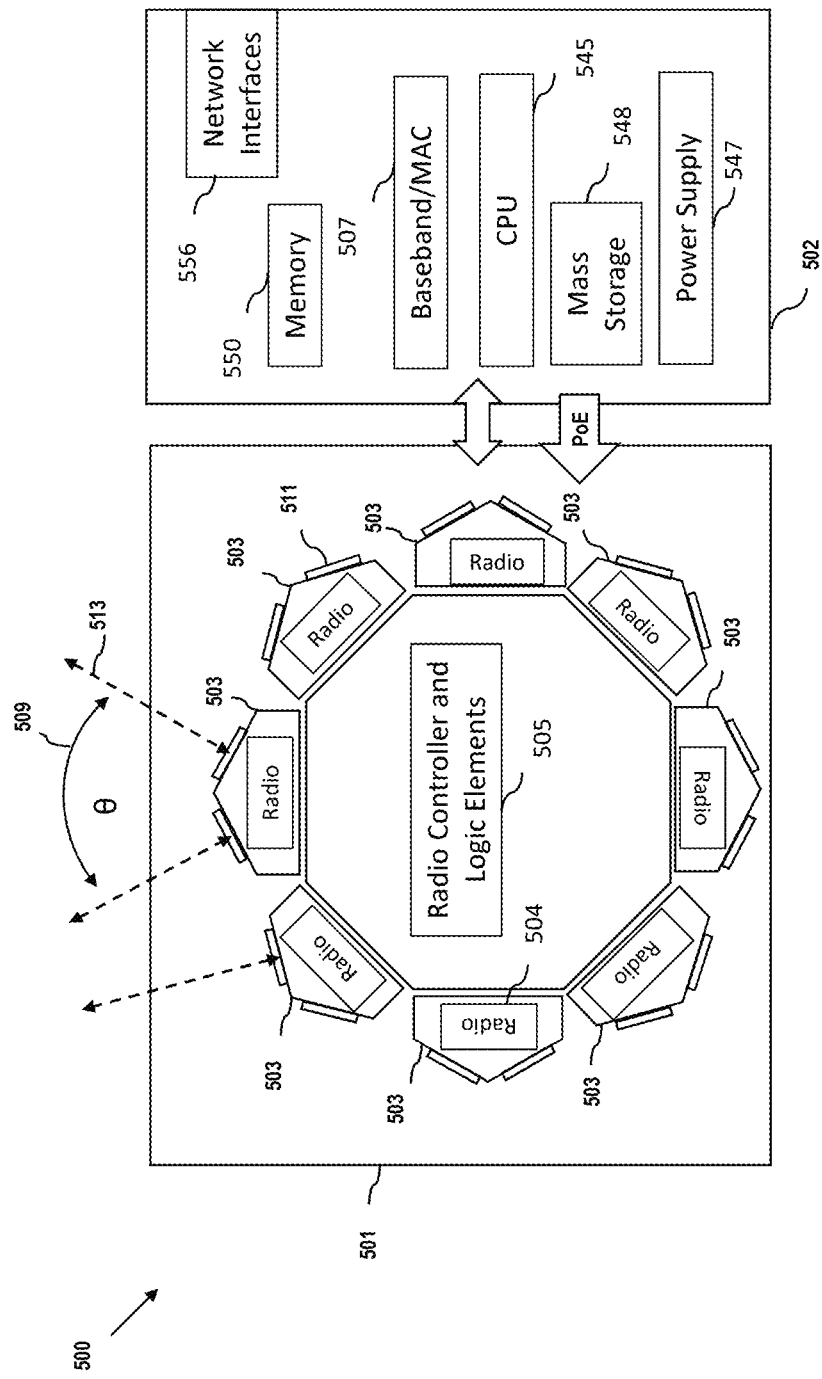
FIG. 5 is a logical block diagram of a first exemplary embodiment of a CPE apparatus with an array of sectorized narrow-beam radio apparatus and associated controller with logical elements, according to the present disclosure.

FIG. 5 illustrates an exemplary embodiment of a CPE apparatus 500 according to the disclosure, which includes an antenna module array and radio portion 501, and an electrically connected CPE portion 502. The radio portion includes a plurality of radio elements 503, each including a radio head (e.g., front end, FFT/IFFT processing, etc., as discussed in greater detail with respect to FIG. 7 herein), as well as associated antenna elements (the number of which for each radio 503 varying depending on configuration). The radio portion 501 also includes a radio controller and associated logic elements 504, discussed in greater detail below with respect to FIGS. 5B and 5C).

Figure 3:
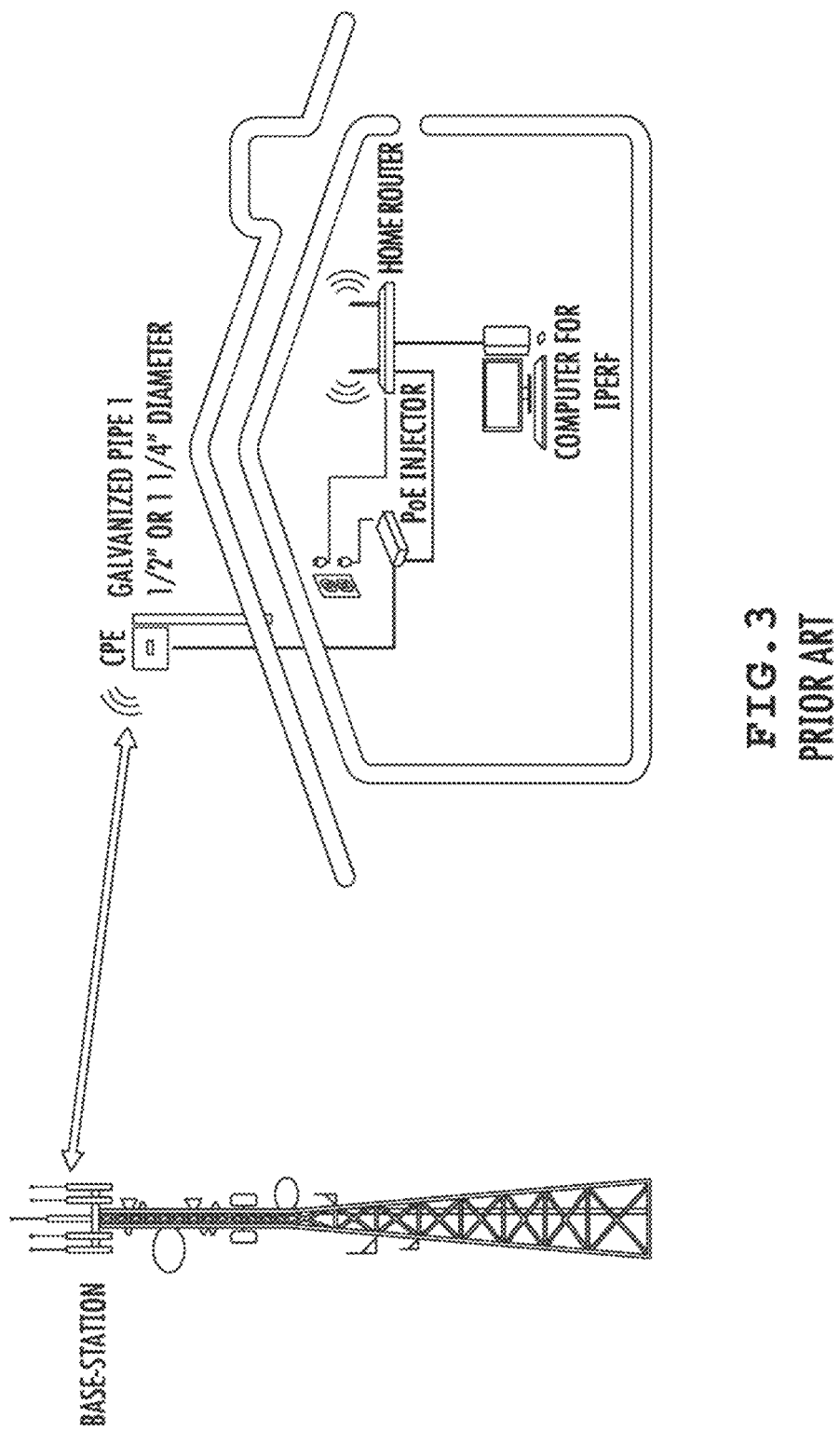
FIG. 3 is a graphical illustration representing a typical prior art Fixed Wireless Access (FWA) installation.
Figure 4:
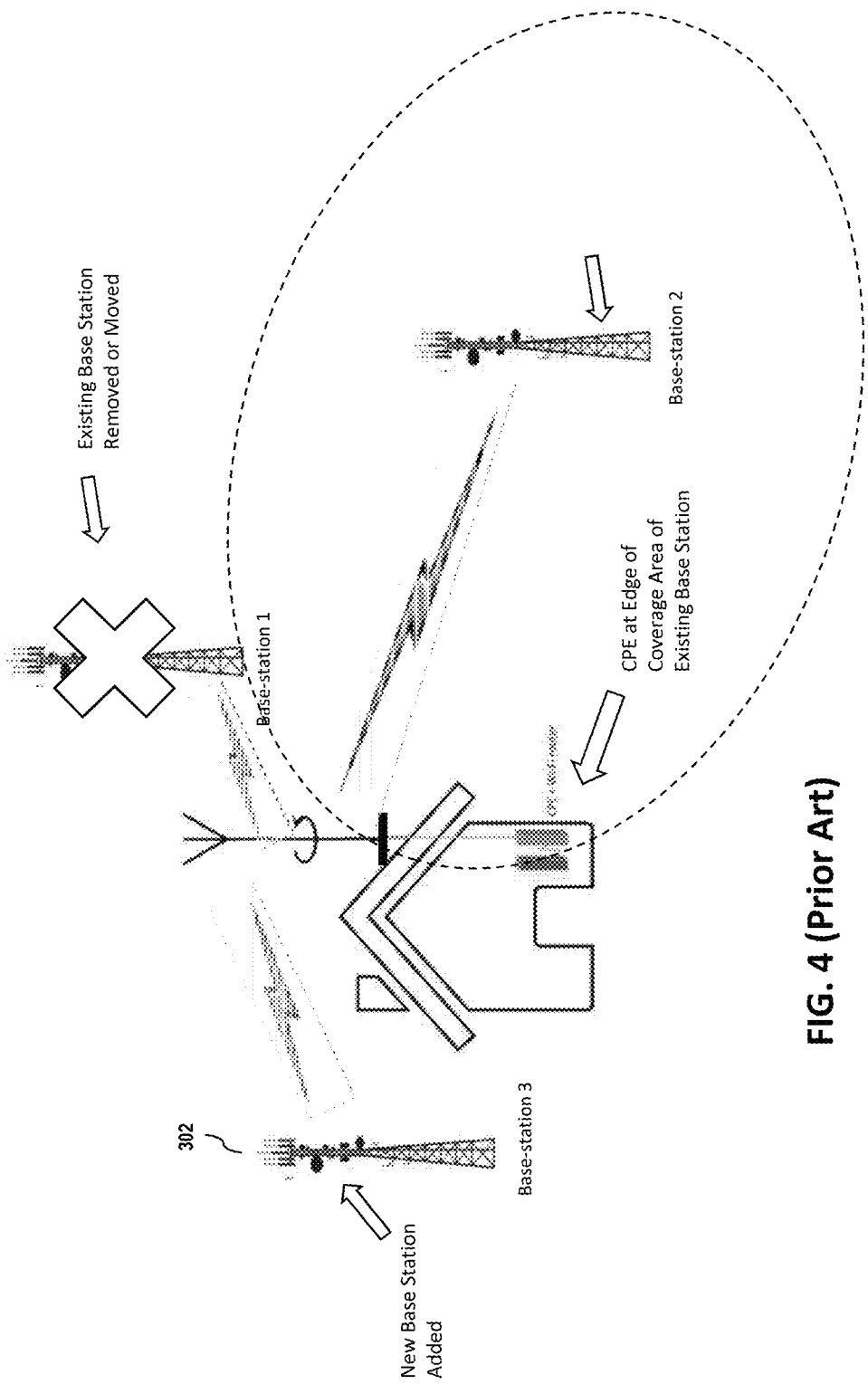
FIG. 4 is a graphical illustration of a prior art wireless network, showing various changes or conditions that may occur such as addition of a new base station, movement or removal of an existing base station, or placement of CPE/FWA apparatus for a premises at the edge of a coverage area or cell of the wireless network.

The radio portion 501 is in one implementation configured to be a standalone unit disposed external to the premises (e.g., to be mounted to a rooftop as in FIG. 3), while the CPE portion 502 is internal to the premises (e.g., may comprise a consumer premises device such as a residential gateway, DSTB, modem, or other such device) and is in electrical communication with the radio portion 501 such as via CAT-5/6 or other cabling. In some configurations, the CPE portion 502 may also include a power supply 506 to power the radio portion (such as via PoE technology or similar), although the present disclosure also contemplates that the radio portion 501 may be separately powered, such as via an exterior 115 VAC or similar source on the premises.

In other configurations, some or all of the CPE portion 502 functionality is disposed within the radio portion 501, or alternatively in other approaches, some of the radio portion components may be disposed within the CPE portion 502. One of ordinary skill will recognize various possible combinations and configurations of the radio portion and CPE portion components given the present disclosure, such as in support of design considerations relating to e.g., weather and element exposure, operating temperature conditions, electromagnetic interference, availability of electrical power, pre-existing premises wiring, ease of maintenance or replacement, and the like.

The exemplary configuration of the CPE portion 502 of the apparatus 500 also includes MAC (media access control) Layer 2 processing and baseband (BB) processing in the form of an IC chipset 507, as well as a processor apparatus (e.g., CISC CPU) or subsystem 545, a program memory module 550, mass storage 548, and one or more network interfaces 556 such as GbE, WLAN, WiMAN, fiber optic, 5G NR, or other medium. A power supply 547 is also included for, inter alia, powering the CPE portions 502 and 501, the latter via e.g., a PoE injector system or similar in the exemplary embodiment.

In one variant (discussed in greater detail below), the BB/MAC chipset 507 is also configured to enable aggregation and dis-aggregation of signals received and transmitted, respectively, via multiple channels (radios 503) of the apparatus 500, such as via STCP or MPTCP protocols operating at the transport layer.

In the embodiment of FIG. 5, each radio apparatus 503 has one or more (here two) sectorized antenna elements 511 each with a narrow beam-width that results in some overlap in coverage. In one exemplary implementation, an overlap of a particular radio can be roughly 30% with the nearest antenna of the next radio 503. However, as discussed further elsewhere herein, individual radio apparatuses 503 can be selectively activated/deactivated so that not all of the radio apparatus 503 are activated at once, and thus, the overlap and/or interference can be minimized further. Moreover, this activation/deactivation can be performed on a temporal basis, including coordination between two adjacent radio apparatus 503 or individual antenna elements 511 thereof, such that e.g., two adjacent antenna elements 511 of two adjacent radios 503 are not active at the same time (e.g., one off while the other receiving or transmitting, then vice versa), via control by the FPGA logic elements or other controller logic operative to execute on the CPE as described subsequently herein.

As discussed further infra, the radio controller and other elements can be implemented to be configurable, based on use of a configurable logical device such as a Field-Programmable Gate Array (FPGA) or Complex Programmable Logic Device (CPLD). As discussed in greater detail with respect to FIG. 6A subsequently herein, the angle θ 509 between the nominal beam centerlines of the two antenna elements of each radio 503 may be set to any desired value (whether via permanent mount, or via physically adjustable mount such as where each antenna element can articulate within a prescribed range in at least azimuth), such that the desired coverage of the array is achieved. For instance, in the embodiment of FIG. 5, an equilateral octagonal shape is chosen for the array, such that each facet containing a radio 503 is 45 degrees in azimuth different than each of its next adjacent facets. As such, the two antenna elements 511 shown in FIG. 5 may each be disposed at desired angles relative to an orthogonal vector for their respective facet. For instance, in one variant (FIG. 6), each of the elements 511 is oriented such that its nominal beam centerline 513 is at an angle of 30 degrees with the aforementioned vector, thereby making θ=60 degrees. Depending on beam dispersion and direction (as discussed in greater detail elsewhere herein, beams may also be electronically steered in a desired direction from one or more antenna elements), a desired degree of overlap between adjacent beams (e.g., 30 degrees) is created such that the apparatus 500 can steer both transmit and receive beams in any desired azimuth direction. This approach advantageously avoids any directionality or chirality of the apparatus having to be considered upon installation; i.e., an installer can orient the apparatus in literally any direction (in terms of azimuth), thereby making installation simpler and less time consuming.

It will be appreciated, however, that the present disclosure also contemplates embodiments of the apparatus 500 which may have some degree of directionality, including those: (i) which have 360 degrees of azimuth coverage yet which have certain "sweet spots" or angular dispositions which will produce better results than others, and (ii) which do not have complete 360-degree azimuth coverage, such as for use in applications where a large obstruction or natural feature (whether due to the premises itself, or natural such as a sheer rock face immediately adjacent the property) makes reception/transmission of signals viable within only certain ranges of azimuth.

It will be appreciated that such CPE 500, which includes one or more radio apparatus 503 with one or more sectorized antenna elements 511, can provide a similar advantage in some respect as so-called spatial diversity, including "massive MIMO (Multiple Input Multiple Output)." As supported by 3GPP for LTE and 5G NR, MIMO and massive MIMO each utilize a number of individual antennae to in effect "add" or divide signals being received or transmitted, respectively, so as to permit enhanced signal quality. The multi-radio/antenna capability of the CPE apparatus 500 (e.g., two or more narrow beam-width beams of two or more respective radio apparatus 503) may further be used consistent with existing MIMO or similar techniques codified in e.g., existing 3GPP standards. For example, two 3GPP spatial diversity channels may be each assigned to respective ones of radios/antennas on the CPE apparatus 500, or each spatial diversity channel may be further "split" across two or more radio/antenna elements (e.g., "4 from 2"). Various other configurations will be appreciated by those of ordinary skill given the present disclosure; see also the subsequent discussion herein regarding FIGS. 12-12D.

More details regarding the radio controller and other logic elements 505 are discussed further infra.

Figure 5A:
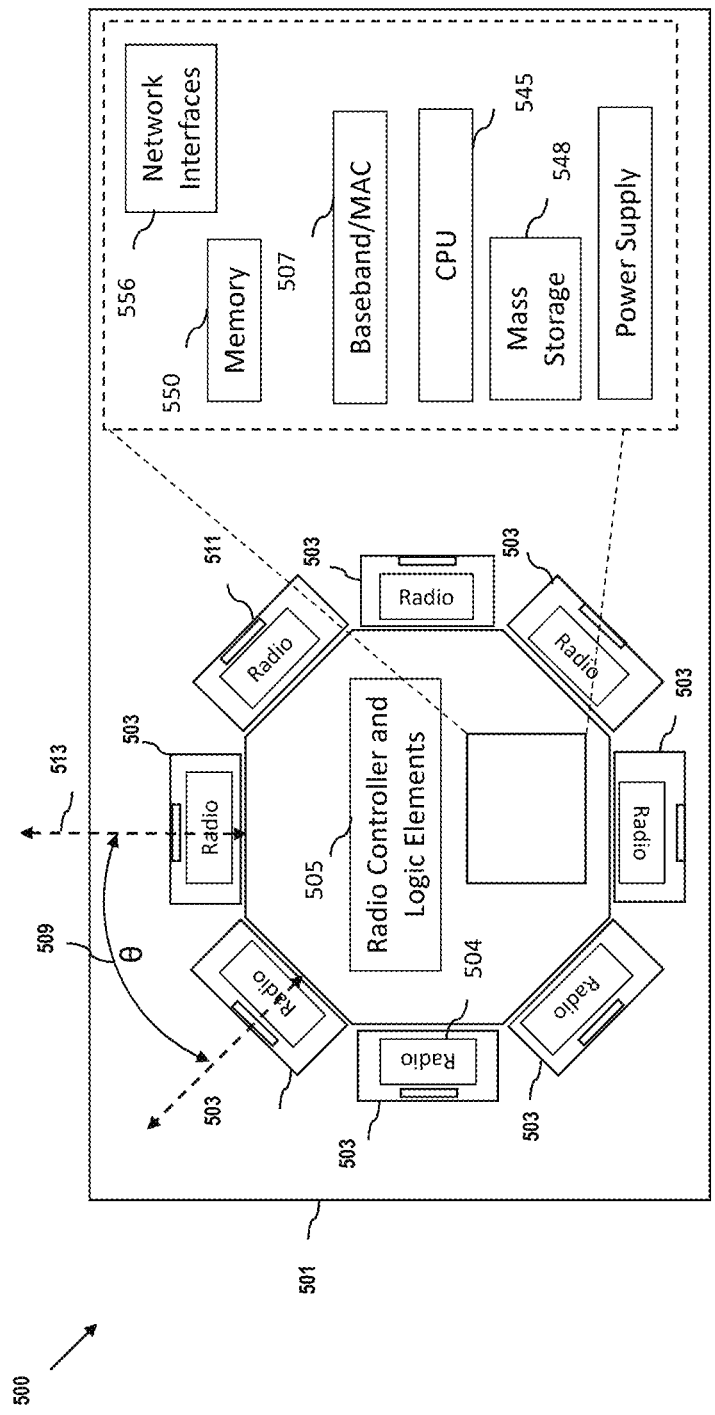
FIG. 5A is a logical block diagram of a second exemplary embodiment of a CPE apparatus with an array of sectorized narrow-beam radio apparatus and associated controller with logical elements, according to the present disclosure.

FIG. 5A illustrates an alternate configuration of the CPE apparatus 500 of the disclosure, wherein a single (narrow beam dispersion) antenna element 511 is used in place of the two elements of the embodiment of FIG. 5. It will be appreciated that the beam width or dispersion of each antenna element (i.e., the breadth of its radiation/sensitivity lobe) may be varied from that of the elements 511 of FIG. 5; e.g., made wider, so as to assure that no gaps in azimuth coverage exist, and to achieve the desired level of beam overlap (e.g., 30% in the prior example). As shown, in this embodiment, based on an octagonal base form factor 525, each of the antenna normal vectors 513 is at 45 degrees relative to its neighboring radio elements 503.

Various other base and antenna form factors and configurations will be recognized by those of ordinary skill given the present disclosure. For example, one might utilize an equilateral hexagonal base, each of the six radios thereof including e.g., one or two antenna elements 511.

Additionally it will be recognized that more than one radio "head" 504 may be used within each radio apparatus 503, such as where each separate antenna element has its own transceiver chain. Likewise, two or more radios may be used for each individual antenna element, such as where two disparate air interface types or standards are supported for each antenna element.

Figure 5B:
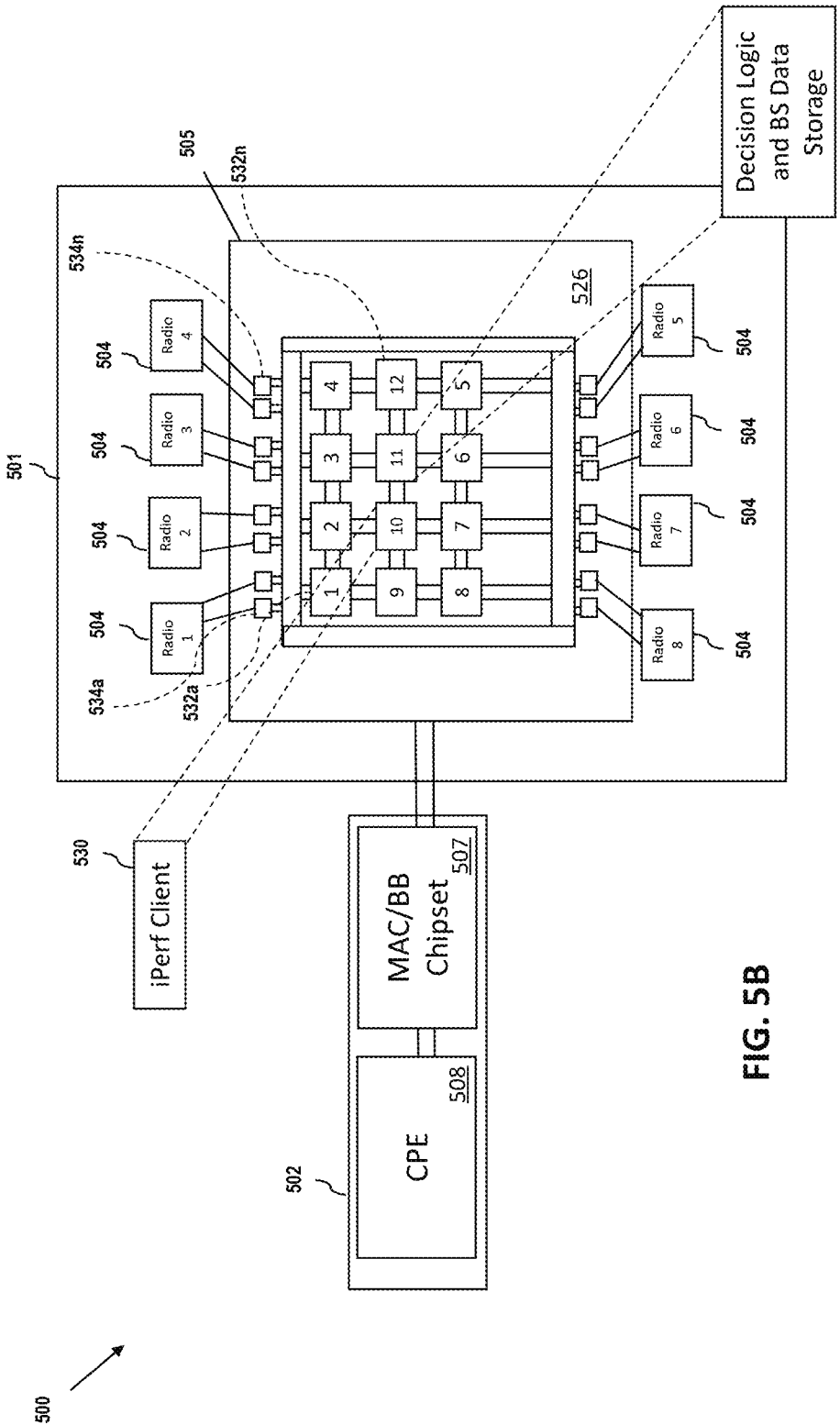
FIG. 5B is a logical block diagram of one exemplary implementation of the CPE apparatus of FIGS. 5 and 5A, illustrating an exemplary FPGA integrated circuit (IC), useful with various aspects of the present disclosure.
Figure 5C:
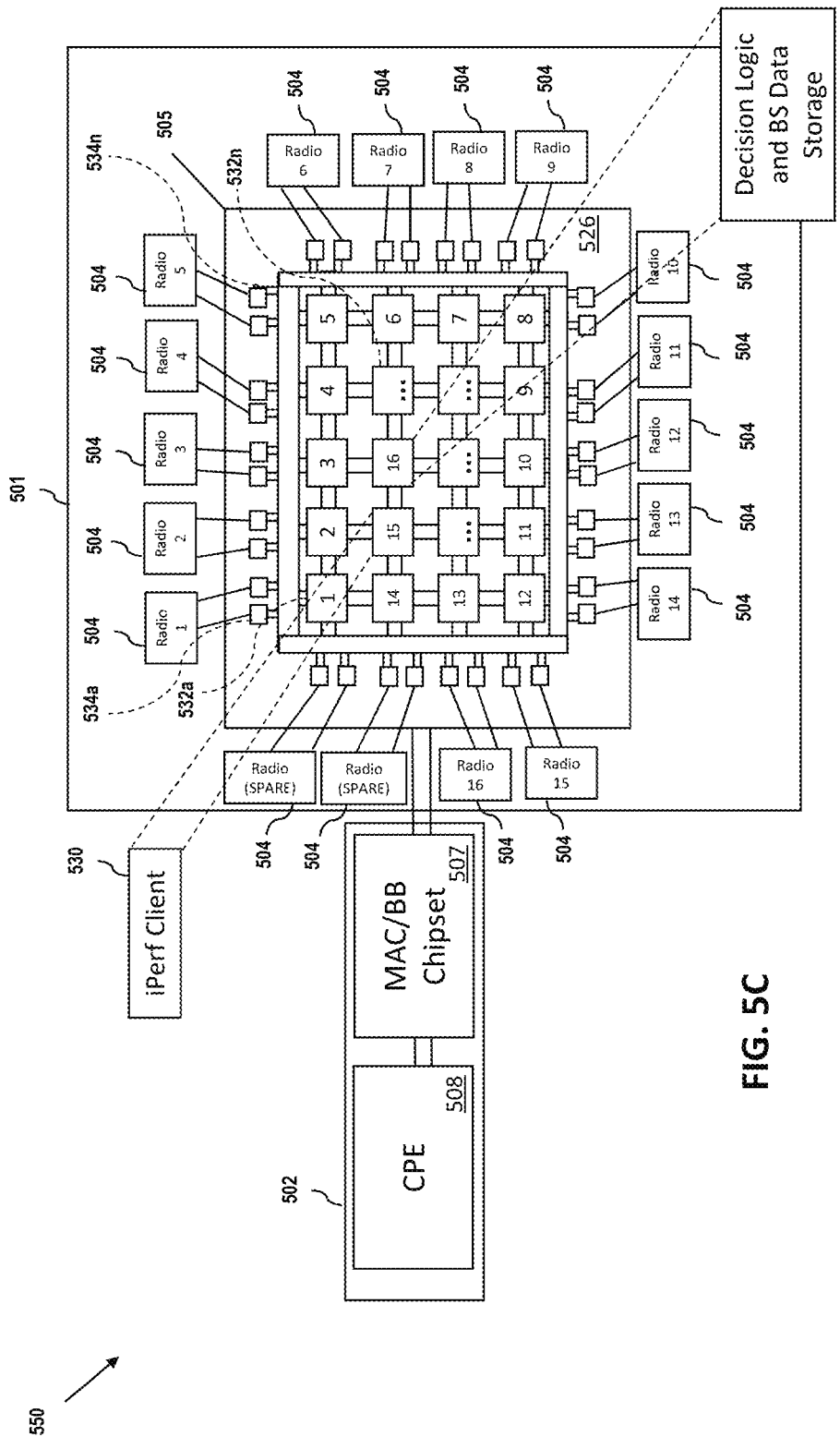
FIG. 5C is a logical block diagram of another exemplary implementation of the CPE apparatus of FIGS. 5 and 5A, illustrating an exemplary FPGA integrated circuit (IC), useful with various aspects of the present disclosure.

FIGS. 5B and 5C illustrate exemplary embodiments of the radio controller and other logic elements 505 as discussed with respect to FIGS. 5 and 5A. In one embodiment, as shown in FIG. 5B, the radio controller and other elements 505 can be implemented on a configurable logical device such as a FPGA with one or more CLBs (configurable logic blocks) 532. In one embodiment, an exemplary Xilinx Adaptive Compute Acceleration Platform (ACAP) device with Versal architecture is utilized as the basis of the FPGA logic 505, although other devices and architectures may be used consistent with the present disclosure.

As a brief aside, it is known that hardware-based logic includes the advantage of great speed relative to software-based implementations of the same logic. For instance, a custom ASIC fabricated for a particular application will greatly outstrip a software-based counterpart at implementing the same logic. However, ASICs generally suffer from a lack of flexibility or configurability. At the other end of the spectrum, a completely software-based solution (e.g., one executed on a CISC or RISC processor, or even GPUs, with little or no hardware logic per se) has complete flexibility, but is lacking in performance relative to the ASIC.

As such, a "happy medium" between these two paradigms is the FPGA (and similar related devices, such as reconfigurable compute fabrics (RCFs) and PLDs), which in effect utilizes some elements of both. A typical FPGS implementation will have a number of specialized functional blocks, including portions of which that operate using hardware-based gate logic, yet which are at a macro-scale combinable with other blocks of the device so as to permit some degree of flexibility. Such FPGAs may also have one or more companion RSIC or other types of cores to permit inter alia, code execution.

Hence, the exemplary embodiments of the CPE apparatus 500 of the present disclosure utilize such FPGA(s) or similar devices to permit both (i) a suitable level of performance in terms of speed and bandwidth, and (ii) a high degree of configurability/re-configurability of the FPGA and logic elements associated therewith so as to perform different functions with respect to individual ones of the radios 503 (including subsets thereof simultaneously). Based on either indigenous logic within the FPGA (e.g., the "decision maker" process described elsewhere herein), software-based logic executed on the CPE apparatus' CPU or BB processing, or even logic disposed remotely, such as within the supporting RAN or MSO infrastructure, the configuration of the CPE apparatus as a whole can be rapidly changed, including to account for changes in radio path propagation (e.g., due to a new billboard or house being erected), failure or removal of a base station, increased levels of interference, natural forces such as the CPE external portion 501 being misaligned in a wind or snow storm, etc., thereby obviating the aforementioned "truck rolls."

In the embodiments of FIGS. 5B and 5C, each of CLBs 532 (e.g., 1 through 8 for FIG. 5B and 1 through 14 for FIG. 5C) can be programmed for use with respective ones of the radio apparatus 503 via one or more input and output (I/O) contacts 534. In this embodiment, the radio apparatus 503 can include one or more narrow-beam antennae 511, which allows an RF channel between the CPE 500 and a base station; use of the narrow and selectively controlled beams advantageously allow for a very small RF footprint, as well as maximal use of available EIRP (which may be capped, such as in CBRS applications as described above), and minimization of interference with other CPE and base stations which may be operating in the same or similar frequency bands in the local geographic area. In effect, the use of these narrow beam-width, directionally-controlled beams for transmission and/or reception to/from the serving base station(s), allow the CPE 500 to "squeeze every drop" out of the allocated EIRP and other resources, including in high-density environments where interference may be comparatively high due to a high density of CBSDs and/or CPE/FWA. This is in addition to the benefits of rapid reconfigurability afforded by the multi-radio, multi-antenna, FPGA-based design of the CPE generally.

The importance of the foregoing capabilities is not to be understated, especially for an MSO or other service provider—the ability to custom-configure each CPE remotely both at and after installation, so as to maximize its throughput for a then-prevailing operational, network-topological, and radio frequency environment is a capability currently lacking in the art, and one which obviates both significant CAPEX (e.g., more base stations) and significant maintenance expenditures, let alone enhancing customer satisfaction due to, e.g., reduced service latency and enhanced reliability of service.

Moreover, service velocity (i.e., rate of introduction of new services or capabilities to extant customers) is greatly enhanced via the apparatus and methods of the present disclosure, since again, re-configuration of a given CPE can be conducted remotely and OTA.

In one variant (shown in FIGS. 5B and 5C), an exemplary IC architecture of the radio controller and logic elements 505 includes a software tool for gathering data relating to e.g., one or more network conditions of the wireless networks in range of a wireless device. For example, an "iPerf"

client 530 can be implemented on one of the CLBs (e.g., CLB 10 in FIG. 5B, and CLB 15 in FIG. 5C) 532 and collect the data relating to the network conditions via one or more of the radios 503, such as via measurement of KPIs such as throughput or BER/PER of each logically connected radio 503 when in operation and communicating with a certain base station.

As a brief aside, as used herein, the term "iPerf client" refers to, without limitation and as applicable, any software tool (e.g., iperf-3.7 as released on Jun. 21, 2019, and iperf2 as originated from iperf 2.0.5) for measuring network performance by e.g., generating one or more data streams of Transmission Control Protocol (TCP) or User Datagram Protocol (UDP). It will be appreciated that other network performance measuring tools, such as Netperf, ttcp, BWPing, Flowgrind, etc., can be used to capture similar data for use with various parts of the present disclosure.

Returning to FIGS. 5B and 5C, the iPerf client 530 can be configured on one of the CLBs 532 and used to measure the KPIs (such as throughput, latency, jitter, etc.) and send them to a decision maker process. In one variant, the decision maker process includes logic (which can also be implemented on one of the CLBs 532, or alternatively within the CPE portion 502, or even a remote or other networked entity such as one in an xNB, AMF, or EPC/5GC). The iPerf client 530 can generate one or more data streams, which can be used to communicate with a particular base station in range of the wireless device, and the resulting KPIs based on the exchange of the generated data with that particular base station can be stored (e.g., locally on the CPE apparatus 500) as measured KPIs associated with the particular base station. This process is then repeated for other base stations which are communicative with the apparatus.

In the illustrated embodiments, each radio apparatus 503 is controlled via a respective CLBs 532 as shown in FIG. 5A. Each CLB 532 is in data communication with each other (via the logic intrinsic within the FPGA as graphically shown, such as via an internal crossbar matrix or fabric), and each radio apparatus 502 can be activated or de-activated based on a control logic that can be implemented via the decision maker process. In one variant, each radio 503 can be assigned to any one of the CLBs of the FPGA, and some CLBs may remain unused at any given time. Similarly, it will be appreciated that one or more CLBs 532 can be dedicated to one or more radio apparatuses 502, and/or other elements such as an iPerf client 530 or a decision maker entity may be assigned to different radios (or subsets thereof). Any of the CLBs 532 can also be selected dynamically to instantiate the foregoing logic elements.

In the embodiment of FIG. 5B, eight (8) CLBs 532 are allocated to respective ones of the eight radios of the antenna and radio array (FIG. 5A)—note that the geometric relationships of FIG. 5A are not preserved in FIG. 5B (or FIG. 5C) for simplicity of illustration.

In the embodiment of FIG. 5C, more CLBs 532 are present, and hence a greater number of different configurations are possible. For example, one radio 503 may be assigned to each of the eight (8) radios of the array of FIG. 5A as previously discussed with respect to FIG. 5B, with remaining blocks being used for other logical functions, spares, etc.

Alternatively, the array 505 of FIG. 5C can support a greater number of radios (up to 18), while still maintaining the other CLBs for e.g., iPerf and decision logic functions.

In yet another alternative, the eight (8) array elements 503 of the array of FIG. 5A (which may each have e.g., two antenna elements 511) can be assigned two radios each, such that for instance Radios 1 and 2 in FIG. 5C (and accordingly their serving CLBs 532) might be assigned to the first of the eight array elements 503, Radios 3 and 4 (and their corresponding CLBs) assigned to the second of the eight elements, and so forth.

In yet other approaches, multiple radios may be assigned to each array element 503, yet not for simultaneous use (e.g., one radio and its supporting CLB(s) utilize one air interface technology, while the other radio/CLB for the element supports another different air interface technology). Yet other variations will be appreciated by those of ordinary skill given the present disclosure.

Figure 7:
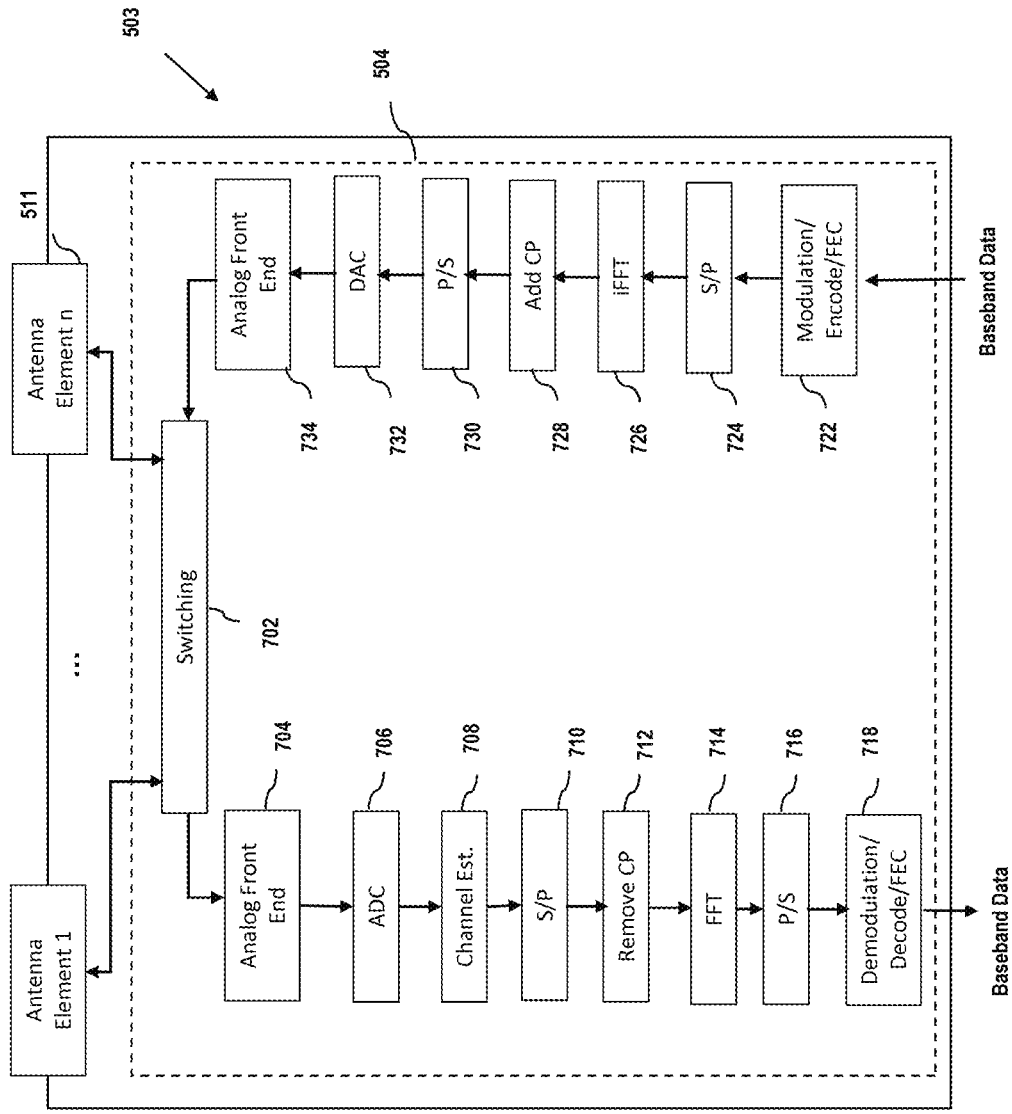
FIG. 7 is a functional block diagram illustrating one embodiment of the radio apparatus of the CPE apparatus of FIGS. 5 and 5A, showing OFDM-based transmitter/receiver chains.

Furthermore, it will be appreciated that control logic (e.g., see CPE Controller Logic 752 of FIG. 7) can be implemented on one of the CLBs 532 as discussed supra, and in some implementations it can be further controlled via a remote control entity (e.g., see MSO CBRS Core Controller 742 of FIG. 7), which is in data communication with the control logic entity disposed on the foregoing IC architecture via e.g., the wireless connection(s) established between the radios 503 and one or more base stations 206 (see FIG. 7).

Figure 9:
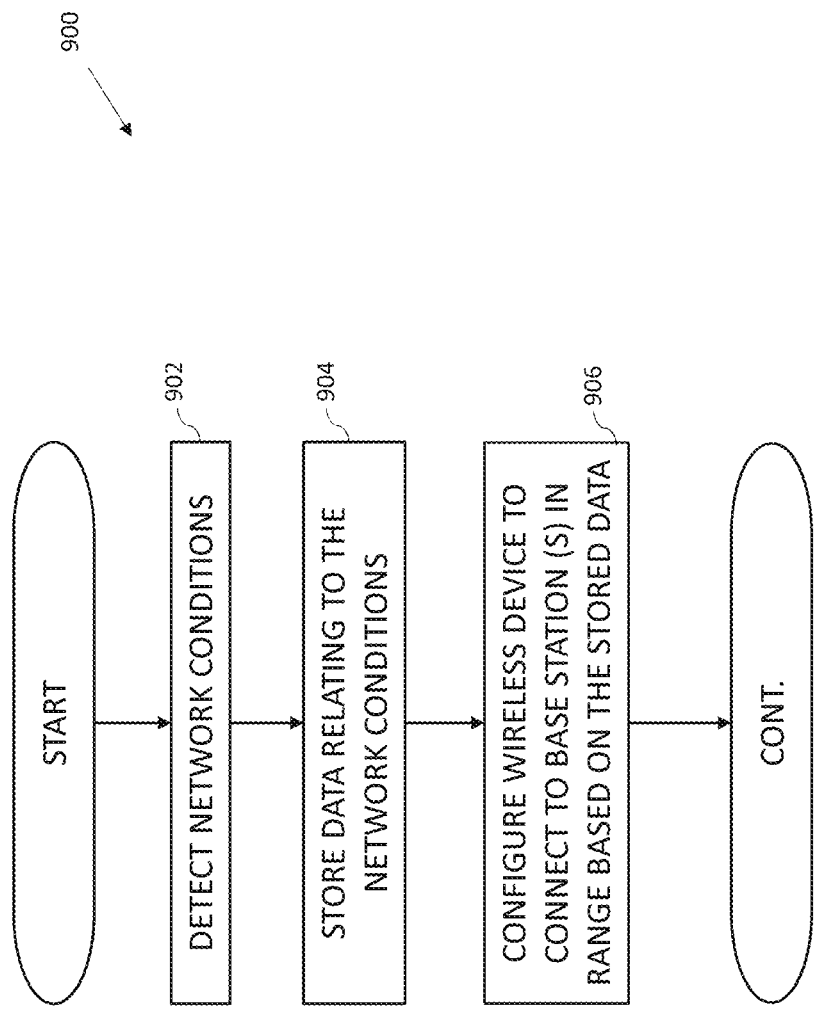
FIG. 9 is logical flow diagram of an exemplary embodiment of a generalized method for configuring a wireless device in a wireless system, according to the present disclosure.

In another variant, the data relating to e.g., the KPIs as collected by the iPerf client 530, can be stored in a data structure that can be implemented e.g., in a tabular format 580 (see FIG. 5D) that associates the collected KPIs of one or more base stations (as identified by any method of identification) with one or more radio apparatus 503. It will be appreciated that any data structure such as hash table, multi-dimensional array, database, etc., can be used to store and maintain the KPIs and related data. Furthermore, it will also be appreciated that the type of KPIs that can be collected, stored, and maintained is not limited to data throughput (e.g., as shown in FIG. 9) but can also include one or more of other KPIs of network conditions including but not limited to latency, jitter, PER, BER, as well as radio link parameter data (e.g., measured RSSI, RCPI, SINR, CQI, or other such parameters, whether actual or derived). Notably, the use of iPerf or similar link performance data allows for reduced computational complexity (as opposed to e.g., calculation of propagation or detailed channel models), since only actual link data performance or throughput is measured and used as a basis of decision making by the decision process (whether local on the FPGA 505, on the CPE portion 502, or remote from the CPE 500).

FIGS. 6A and 6B illustrate exemplary configurations of each radio apparatus 503 of the CPE 500 of FIGS. 5 and 5A, respectively, illustrating the relationship of the various components in more detail. As shown in FIG. 6A, the radio head 504 (see FIG. 7) is electrically connected to the antenna elements 511 via signal interfaces 521, and the radio head is in signal communication with the FPGA 505. Electrical power is also provided to each radio head 504 as shown.

In the embodiment of FIG. 6A, a two-element configuration is used, wherein the antenna elements 511 are disposed at a prescribed angle relative to the normal vector 517 of the underling base facet 525 (e.g., 30 degrees in the illustrated example, yet this value can be varied, and in fact the different elements 511 can each have a different angle relative to the base vector 517 if desired). As previously noted, these elements 511 may in certain implementations also each be manually adjustable in azimuth and/or elevation (not shown).

In one variant, the housing 510 of each radio module 503 comprises a molded or otherwise environmentally resistant enclosure which houses the radio head 504, antenna elements 511, and other components, such that the assembly 503 is substantially modular and can be easily replaced if defective or if a different module 503 with differing capabilities is desired. As such, the present disclosure also contemplates use of both homogeneous (uniform) and heterogeneous (non-uniform) module configurations, such as where certain modules 503 for a given azimuth range are purposely different than others for other azimuth ranges covered by the external portion 501 of the apparatus 500.

Note also that the antenna elements 511 may be made integral with the housing 510 (i.e., such that they penetrate the front face of the housing 510 as shown in FIG. 6A), or alternatively be completely enclosed within the inner volume of the housing (as shown in FIG. 6B).

In one embodiment, the underlying base 525 of the external portion 501 of the CPE apparatus 500 includes a circuit board (not shown) having the FPGA 505 and other electronic components mounted thereon, including ports for electrical (signal) and power connections to external devices. In one variant, the circuit board includes an RJ-45 type ICM connector suitable of PoE and data connectivity for connection with the CPE (internal) portion 502 of the apparatus 500, the latter being disposed for example inside the premises structure such as the customers home.

FIG. 6B illustrates a configuration using a single antenna element 511 per radio 503. In this embodiment, and octagonal base 525 is again used; however, this may be varied as noted; e.g., to include more or less facets, non-equilateral geometries (e.g. extended or oblong octagon, hexagon, etc.), as well as other configurations. Note also that in this embodiment, the antenna element 511 of each radio 503 is contained internally within an outer environmental cover, versus being disposed external to the housing (or penetrating via an aperture therein). As such, the housing/environmental cover in this embodiment is fabricated from a material having sufficient permeability to RF energy within at least the desired bands (i.e., such that significant signal attenuation by the housing is avoided).

Exemplary Radio Head Apparatus—

FIG. 7 illustrates one embodiment of the architecture of the radio head(s) 504 used in the CPE apparatus 500. It will be appreciated that while an OFDM-based radio apparatus having switched receiver and transmitter chains is shown, the present disclosure is in no way limited to either OFDM modulation/access schemes, nor switched chains (or for that matter discrete chains).

As shown in FIG. 7, the antenna element(s) 511 are accessed by the transmitter or receiver chains via a switching matrix 702. For instance, in one variant, the switching matrix 702 allows both elements 511 to be accessed by the same chain simultaneously. Alternatively, individual antenna elements can be accessed individually by respective ones of the chains. For instance, TDD-based switching may be used for sharing of the antenna element(s) 511 in some approaches. It will be recognized that the switching logic 702 may also be controlled by the FPGA (e.g., one or more CLBs thereof), or other logic, so as to effectuate the desired utilization of the antenna element(s) and/or transmitter/receiver chains of each radio head 504.

In the receiver chain, analog OTA signals are received by the antenna element(s) 511 and switched to the receiver via the switch 702, where they are received by the analog front end 704. They are filtered, down-converted (as needed) such as via IF mixer logic, and converted to the digital domain by the ADC 706. Channel estimation is performed in the CE 708, and serial-to-parallel conversion applied 710. Cyclic prefixes are removed at the CP logic 712, and an FFT applied to transfer the signals from the time domain t frequency domain. Parallel to serial conversion is then applied 716, and the resulting signals demodulated, decoded, and any FEC applied (e.g., Turbo or LDPC) to extract the baseband data.

Conversely, in the transmitter chain, the FEC, encoding, and modulation are applied 722, S/P conversion performed 724, IFFT applied 726, CP added 728, P/S conversion applied 730, and the resulting data is then converted to the analog domain per the DAC 732 for processing by the analog front end 734 and transmission via the antenna element(s) 511.

Exemplary Radio Control System—

Figure 8:
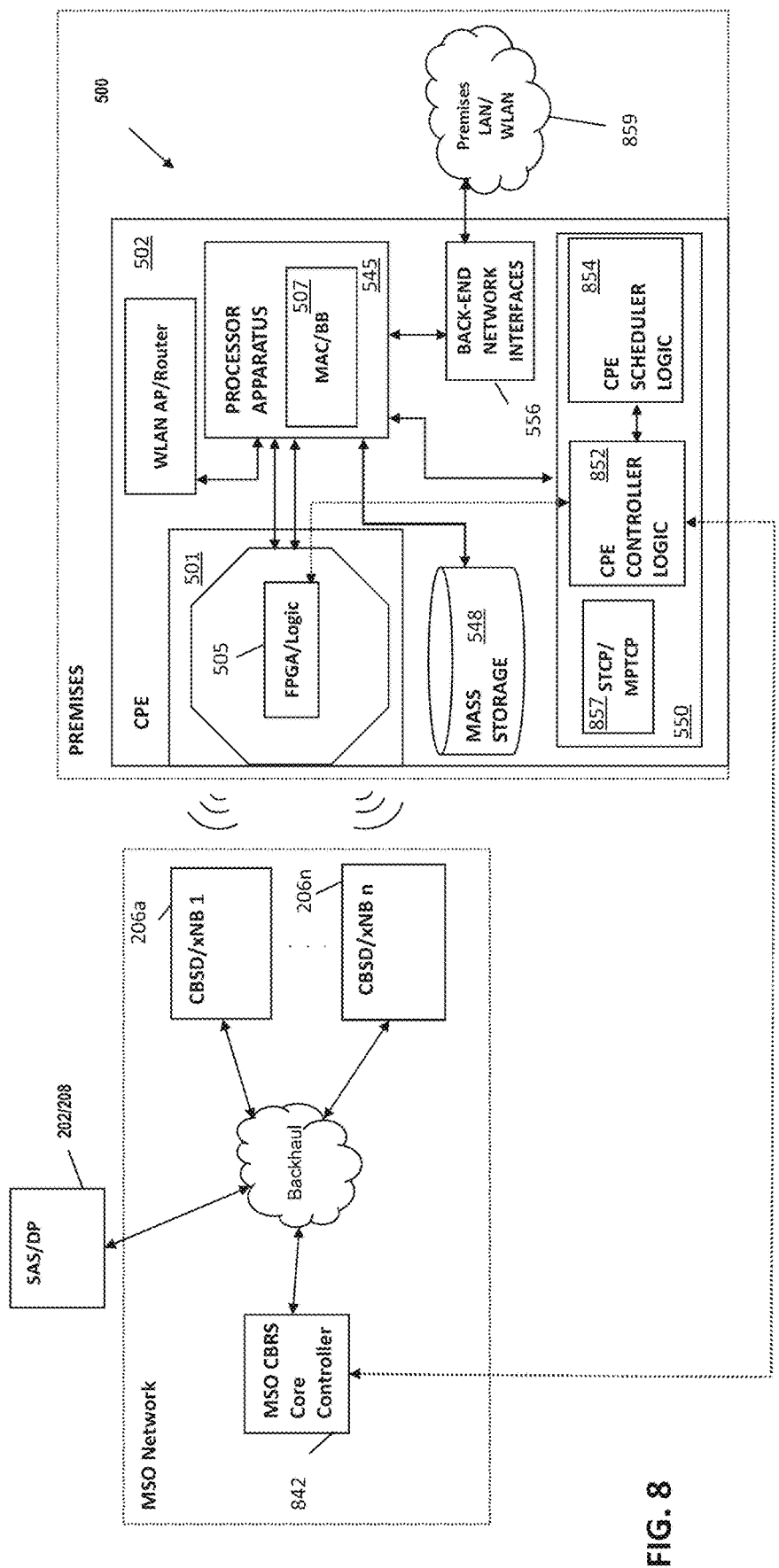
FIG. 8 is a functional block diagram representing an embodiment of an exemplary CBRS-based wireless system architecture according to the present disclosure.

FIG. 8 is a functional block diagram illustrating an exemplary embodiment of network architecture, wherein a CPE 500 is in data communication with one or more base stations (e.g., CBSD xNBs) 206a-206n, and a network controller and scheduler apparatus of a wireless network that e.g., utilizes a quasi-licensed wireless system such as CBRS, LSA, TVWS, DSA, etc. Although FIG. 8 is illustrated in the context of CBRS technology based on 3GPP protocols and infrastructure, it will be appreciated that a similar system can work with a wireless network, e.g., one that utilizes another unlicensed or quasi-licensed wireless system such as LSA, TVWS, DSA, NR-U, Multefire, etc.

Figure 11:
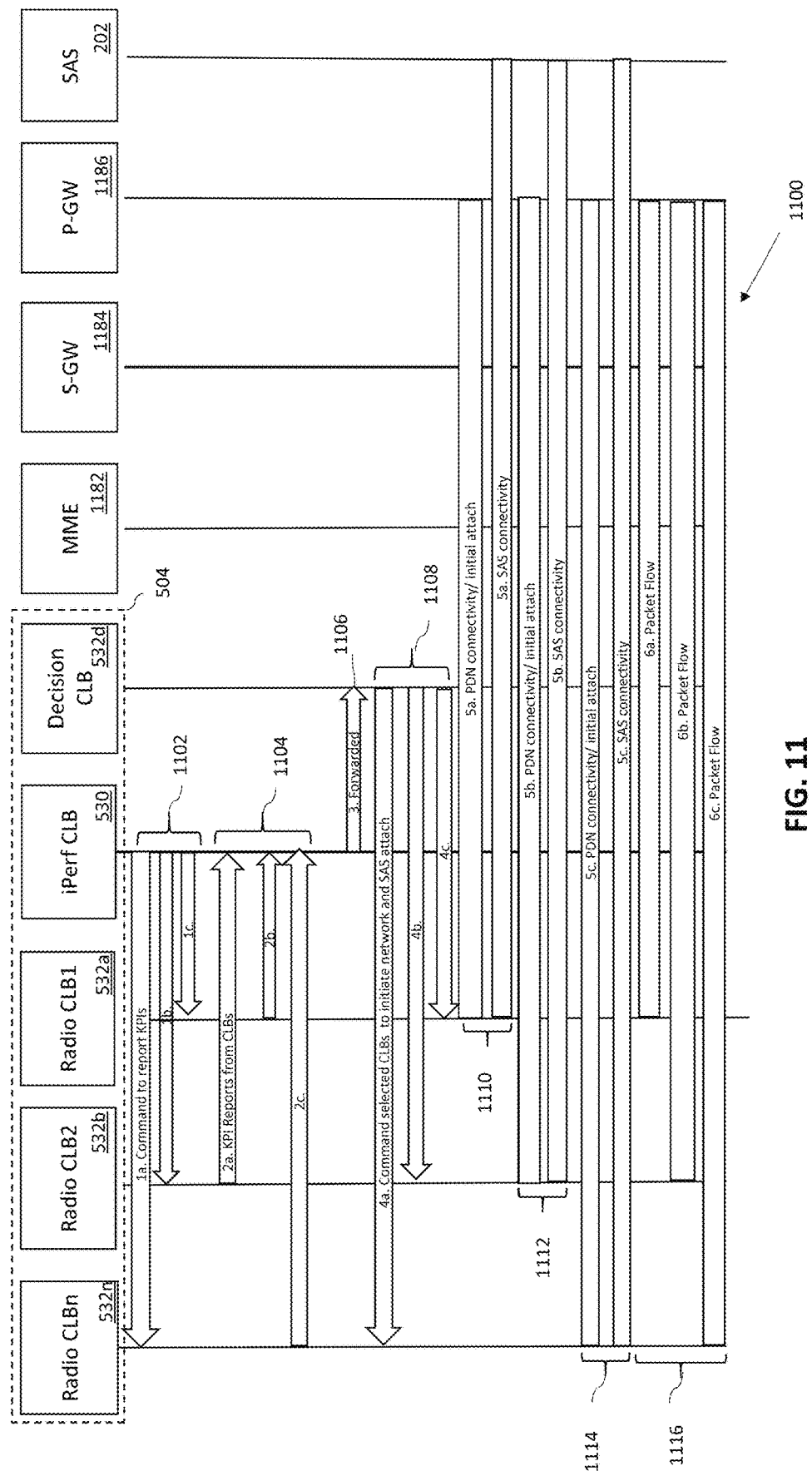
FIG. 11 is a ladder diagram illustrating communications used as part of operation of one embodiment of a network architecture including the CPE apparatus of FIG. 5.

At a high level, the exemplary CPE 500 of FIG. 8 is configured to logically interface with the cognizant SAS/DP 202/208 (specifically, the CLBs of the FPGA 505 in the exemplary embodiment; see discussion of FIG. 11 provided subsequently herein), and also the MSO CBRS core controller 842 (if present) and the various CBSD/xNBs 206 (which may also be within the control of the MSO CBRS core controller 842).

In the exemplary embodiment, the processor 545 can include one or more of a digital signal processor, microprocessor, FPGA (i.e., in addition to or as part of the radio unit FPGA 505), GPUs, or plurality of other processing components mounted on one or more substrates. The processor 545 can also comprise an internal cache memory, and is in communication with a memory subsystem 550, which can comprise, e.g., SRAM, flash and/or SDRAM components. The memory subsystem 550 can implement one or more of DMA type hardware, so as to facilitate data accesses as is well known in the art. The memory subsystem 550 of the exemplary embodiment contains computer-executable instructions which are executable by the processor 545.

The processing apparatus 545 is configured to execute at least one computer program stored in memory 550 (e.g., a non-transitory computer readable storage medium); in the illustrated embodiment, such programs include e.g., logic to implement the CBSD/xNB 206 and beam/radio selection and scheduling, in conjunction with the functionality provided by the FPGA 505 (including iPerf monitoring, decision logic functions, etc.). Other embodiments can implement such functionality within dedicated hardware, logic, and/or specialized co-processors (not shown). Moreover, depending on the configuration and functionality required, the FPGA 505 itself may be tasked with all decision making in terms of radio/antenna a CBSDs election.

Figure 13A:
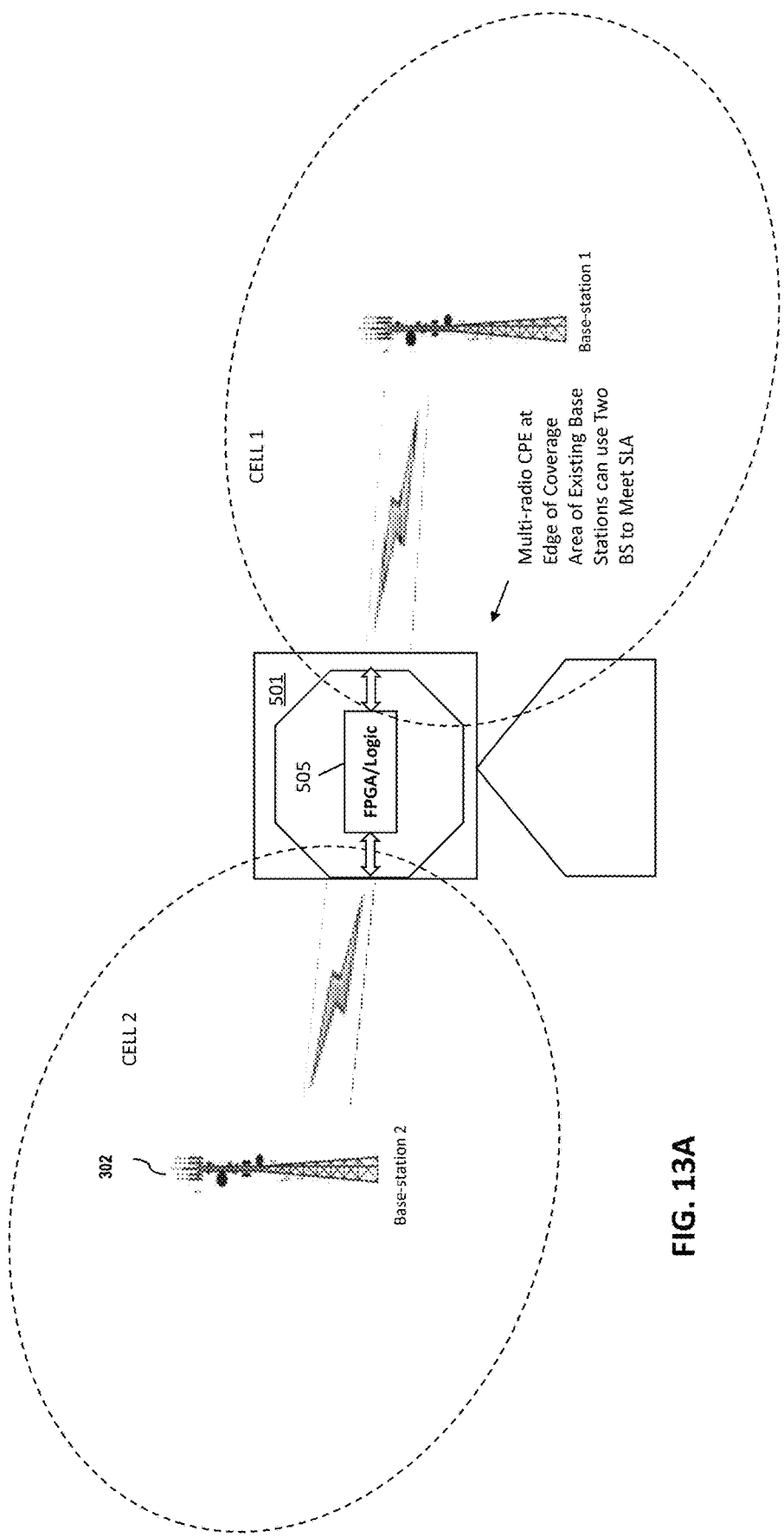
FIGS. 13A-13C are graphical illustrations of exemplary operational scenarios wherein the CPE apparatus of the present disclosure may be utilized to enable otherwise unattainable service (e.g., being out of coverage) or enhance existing but limited service (in-coverage supplementation).
Figure 13B:
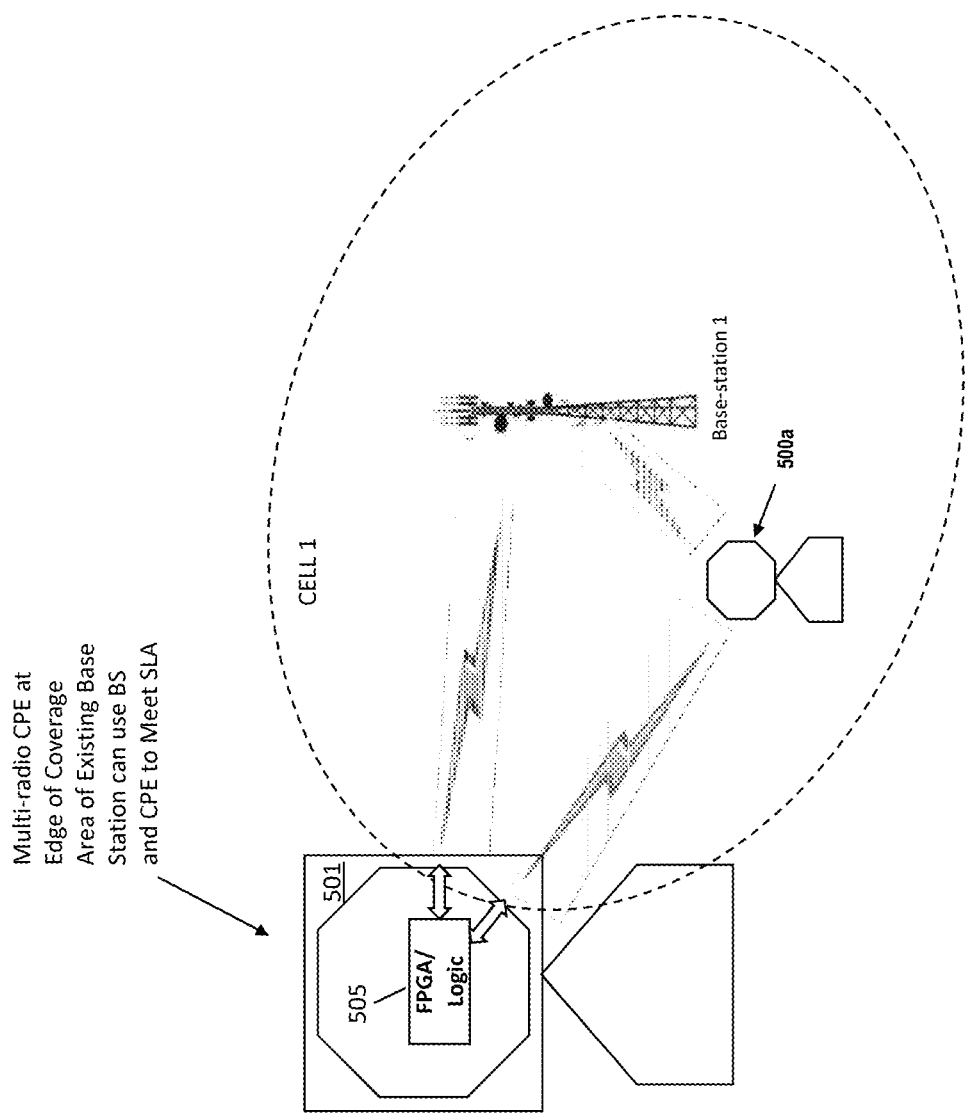
Figure 13C:
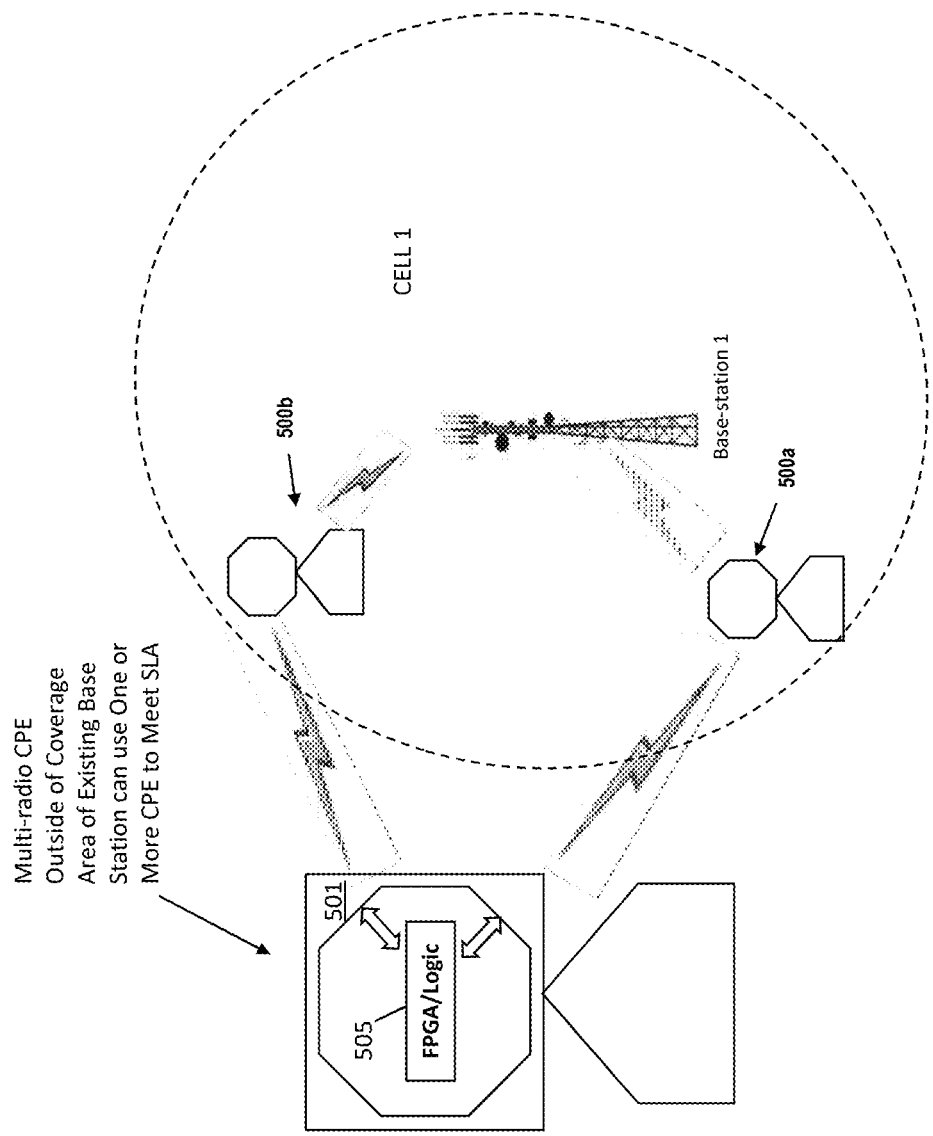

In some embodiments, the controller/scheduler logic programs 852/854 utilize memory 550 or other storage 548 configured to temporarily hold a number of data reports or files before transmission to the MSO CBRS Core controller 842 (if present), as well as schedule/assignment data packets for transmission to any target CPE/FWA radio path controllers (RPCs; not shown) associated with other CPE/FWA devices which the CPE 500 may communicate with (see FIGS. 13A-13C herein).

In other embodiments, application program interfaces (APIs) can also reside in the internal cache or other memory 550. Such APIs can include common network protocols or programming languages configured to enable communication between the CBSD/xNBs 206 and controller/scheduler 852/854, and the controller/scheduler 852/854 and other network entities such as network-based controllers 842 or servers. Data stored (whether in the CLBs of the FPGA 505, or in the "beck end" storage of the internal CPE portion 502) may also relate to prescribed 3GPP or CBRS reporting from the CPE/FWA radio heads and associated controller logic (not shown; e.g., measurement of reported data, RSSI, CQI, phase/timing, beams, etc. for use in evaluating and selecting the best or optimized CBSD/xNBs and beams for the given target CPE/FWA 500).

In operation, the CPE 500 may also issue spectrum requests to the prevailing SAS/DP 202/208 (i.e., via the CBSDs or other mechanism) in order to register with the SAS and ultimately receive a spectrum grant to enable operation.

Exemplary Methods—

Referring now to FIG. 9, one embodiment of a general methodology for configuration of a wireless device such as the CPE 500 of FIG. 5 is described.

As shown, per step 902, the network conditions are detected. As discussed elsewhere herein, the network conditions can be obtained via a number of different methods, including (i) use of a tool (e.g., an iPerf client) that can e.g., generate one or more data streams to send to a base station via one or more of the radio apparatus 503 of the wireless device to obtain network performance KPIs; and/or (ii) use of one or more the radio apparatus as spectrum analysis or data gathering devices, such as to measure or enable derivation of RF related parameters such as signal strength (including in cases where no RRC Connected state is established between a given radio 503 of the CPE 500 and a corresponding base station, such that the iPerf analysis is unavailable). While iPerf data is highly useful in detecting, inter alia, actual "user experience" conditions such as data rate or throughput which a user would see in the connected state, the present disclosure contemplates use of various types of performance measurement paradigms depending on e.g., the status of the connection.

In one variant, one or more base stations (e.g., CBSDs 206) in range of the wireless device are first identified (including passively via RF signal measurements associated with a given azimuth, and/or actively via identifying data specific to the given CBSD which is provided to the CPE 500 during its initial or subsequent assessment of its surrounding environment). Once a connection is established, the iPerf tool can enable exchange of the one or more data streams with each of the identified base stations via each one of the radio apparatus 503 of the wireless device 500. In this way, more data (e.g., than enabling exchange of the one data stream for network performance KPIs with only a subset of the base stations and one radio apparatus as in conventional systems) may be required to be collected, but the larger amount of data are advantageously produce a more reliable identification of a base station that can provide the most optimal wireless service, based on one or more of the measured network performance KPIs, of all available base stations in range of the wireless device. Moreover, a finer level of granularity is possible given the multiple different radio apparatus 503 disposed on the CPE at different azimuths (and associated narrow-beam-width beams which may be generated by each), such that an "interference-mitigated" path to each base station can ultimately be chosen by the FPGA 505.

In another variant, one or more of the base stations in range, and/or one or more of the radio apparatus 503 of the wireless device 500 can first be selected for detecting network conditions (whether passively or actively), so that not all combinations and permutations are checked for network performance KPIs, thereby reducing resource requirements to find base stations to connect to (at least initially). Stated differently, a reduced-scope "quick search" methodology can be employed, including selection of radio apparatus and beams which (based on e.g., stored historical connection or characterization data) are of highest likelihood to provide at least useable connections immediately (even in not fully up to prevailing SLA requirements), which then may be supplemented with additional search if required. For example, based on at least a portion of the data collected with a selected group of radio apparatus 503 and a selected group of base stations 206, a first connection can be made between the wireless device 500 and a base station via a quick-search or initial canvass configuration of the wireless device by the FPGA.

Referring back to FIG. 9, per step 904, the detected data relating to the network conditions is stored e.g., in a data structure that can be in the form of a table 580 as shown in FIG. 5C.

Per step 906 of the method 900, the wireless device 500 is configured so that one or more radio apparatus 503 can be activated to connect the wireless device to one or more base stations 206 based on the stored data. This may include for example (i) connection of a single radio 503 to a single base station; (ii) connection to two or more base stations 206 via respective radios 503; (iii) connection of two or more radios 503 to a common base station, or (iv) yet other configurations (including connection to one or more other CPE/FWA acting as CBSDs; see discussion of FIGS. 13A-13C).

Figure 9A:
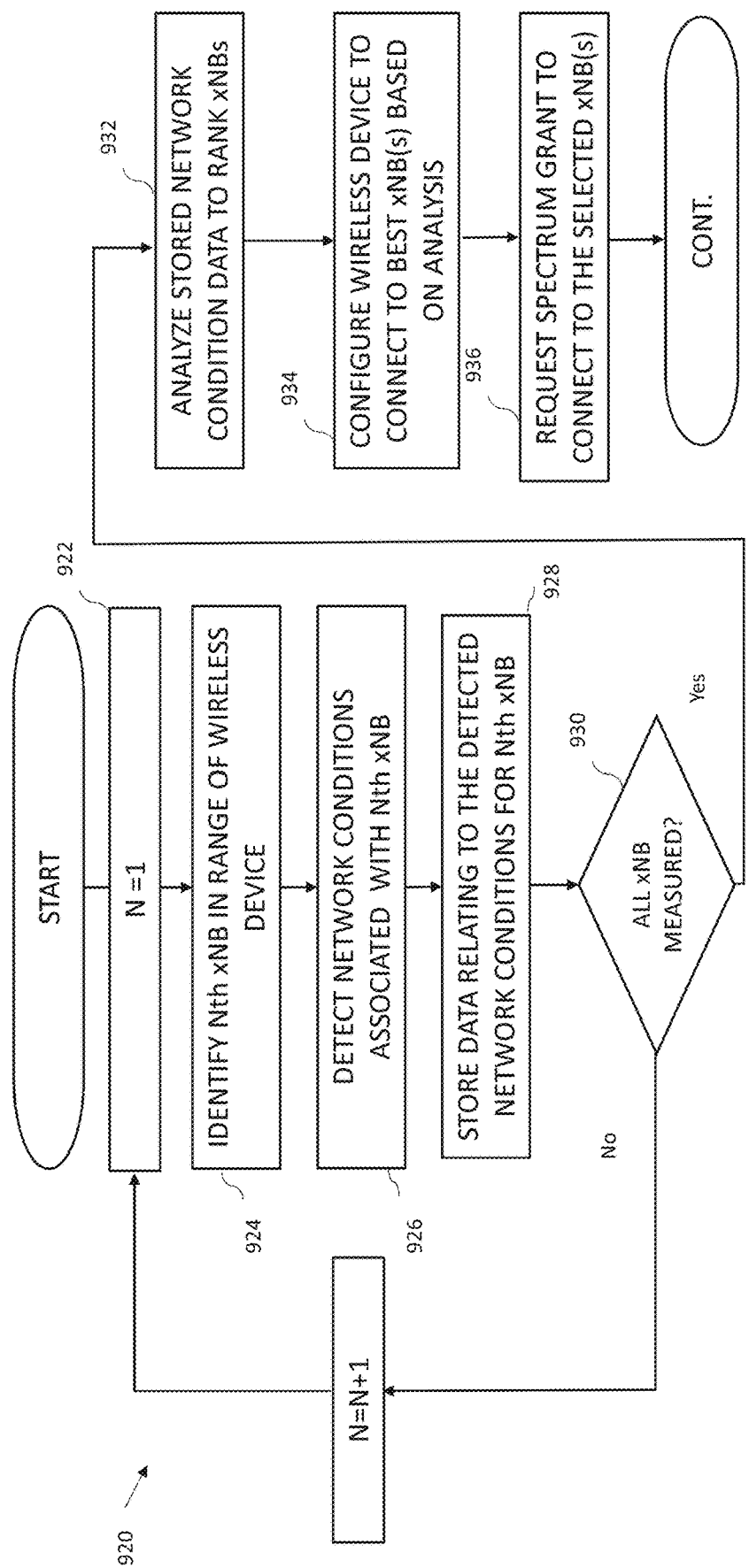
FIG. 9A is logical flow diagram representing one implementation of the generalized method of FIG. 9, adapted for use in a 3GPP-based quasi-licensed (e.g., CBRS) wireless system.

FIG. 9A illustrates one exemplary implementation 920 of the general method 900 of FIG. 9, in the context of a 3GPP-based system using CBRS quasi-licensed spectrum (e.g., GAA, or PAL, or combinations thereof). At step 922, a counter (N) is set to an initial value.

At step 924, the CPE 500 identifies the Nth xNB (CBSD) within wireless range, whether via RF spectrum analysis, prior affirmative data on its presence, or other mechanism. For instance, 3GPP detection mechanisms may be employed between the CPE 500 and the current xNB to identify the existence of the CBSD, and associate it with a given azimuth of the array of radios/antennae.

Next, per step 926, the network and/or channel conditions associated with the detected Nth xNB are measured and stored (step 928).

Once all detected xNBs have been characterized (step 930), the analysis module or CLB of the FPGA 505 is used to evaluate the collected/stored data to rank the xNBs as to quality or desirability of use for that given CPE.

It will be appreciated that the foregoing methodology may be performed iteratively across radios 503 of the CPE 500 as well; e.g., for the Nth xNB, the PFPGA 505 logic may cause iteration for the Nth xNB between radios 1 through n, where n=8 in the exemplary embodiments of FIGS. 5 and 5A. This iteration can allow for collection of data which may be compared across individual radios, in effect allowing the FPGA logic to rank the (prospective) links for each given base station detected. As such, a matrix of channel/link quality data for each radio for each detected base station may be built.

At step 934, the device (CPE) is then configured by the CLBs of the FPGA logic so as to establish connection with the one (or more, as needed) highest ranked xNBs via the one or more (highest ranked) radios 503, including combinations thereof if the prevailing SLA for the CPE 500 cannot be met through a single connection.

Additionally, spectrum grant requests are generated as needed per step 936 (whether by the CLBs themselves, the "back end" processing of the CPE (e.g., CPU, etc.), or by a connected CBSD acting as a proxy for the CPE 500) and transmitted to the SAS to obtain spectrum for use by the CPE and corresponding xNB(s).

Figure 10:
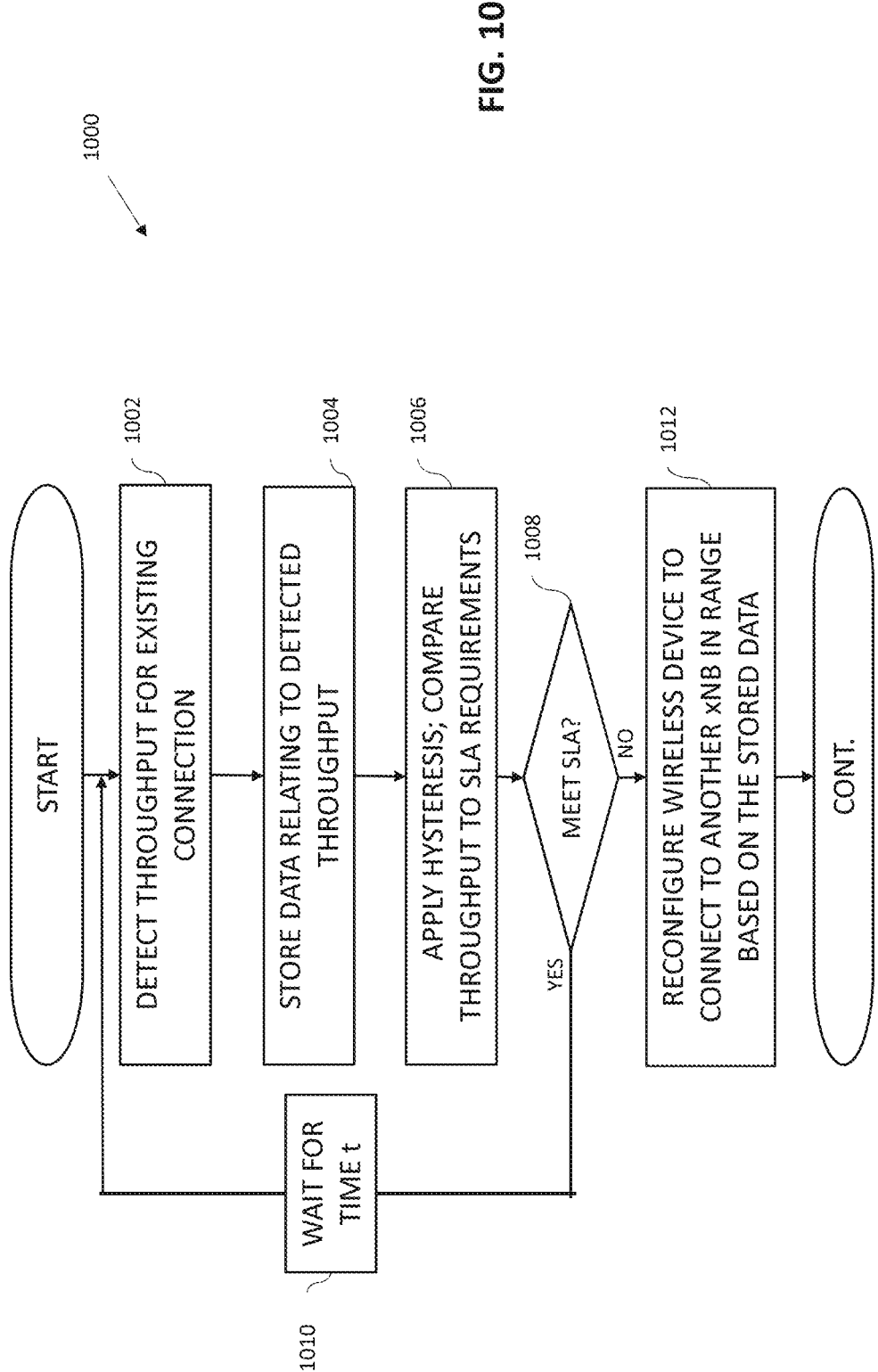
FIG. 10 is logical flow diagram representing one embodiment of a method of operating the disclosed CPE apparatus according to the present disclosure.

FIG. 10 illustrates one embodiment of a method 1000 for determining whether existing connections are sufficient to meet SLA requirements (e.g., after the method of initial connection establishment of FIG. 9/9A are used) is shown. At step 1002, throughput for an existing established connection (e.g., RRC_Connected state) is measured, such as via the iPerf CLB (see FIG. 11 below for exemplary ladder diagram). The obtained data is then stored in another CLB or storage device of the CPE (step 1004), and the throughput as measured (e.g., Mbps) compared to the prevailing SLA for the CPE 500 per step 1006. In one embodiment, so as to mitigate "dither" of the algorithm (e.g., conditions where throughput oscillates above and below SLA, such that the algorithm "hunts" or dithers unduly between static operation and reconfiguration per step 1012), an averaging and hysteresis routine is applied that (i) averages out the performance over a prescribed period of time, and (ii) prevents frequent state changes (such that the threshold for state change is altered so as to make it more difficult, for at least a period of time, for the state to change back to a former value, thereby allowing the throughput data to "settle out"). This way, the CPE FPGA logic is not constantly reconfiguring the FPGA and CLBs and establishing/tearing down connections between a given radio and a given CBSD.

When the SLA is putatively met at step 1008, a timer or other mechanism is used to enter a with state 1010 before the CPE again assesses the throughput of a given connection (or the device as a while, such as where two or more constituent connections are used). Note that this methodology may also be performed iteratively on a per-radio or per-connection basis, such as where each of the constituent connections is subject to the logic of FIG. 10, and only then is a "composite" or aggregated throughput assessment made. As such, it will be recognized that the aforementioned averaging and hysteresis mechanisms may be applied on a per-connection or per-radio basis, and/or with respect to the device as a whole.

Exemplary Signal Flow—

Referring now to FIG. 11, the signal/message flow associated with one embodiment of a method of operating a wireless device (such as the CPE 500 of FIG. 5) to connect to a wireless network based on the network conditions is shown and described, in the exemplary context of a 3GPP-based system utilizing quasi-licensed spectrum (e.g., CBRS). In the illustrated configuration, the network includes a SAS 202, LTE MME (Mobility Management Entity) 1182, S-GW (Serving Gateway) 1184, P-GW (Packet Data Network Gateway) 1186, and various CLBs 532 of the configurable logical device 505 as previously discussed with respect to FIGS. 5B and 5C.

The CLBs can interface with the host SAS 202 directly, or via one or more interposed entities such as xNBs (not shown for simplicity), and computerized domain proxy (DP) entities 208.

At step 1102 of the ladder diagram 1100, the iPerf CLB 530 of the FPGA 505 sends to each of a number of radio-associated CLBs 532 a command to report data (e.g., KPIs obtained via measuring network conditions) obtained from one or more CBSDs/xNBs 206 in range.

At step 1104, each of the CLBs 532 reports the requested data to the iPerf CLB 530 e.g., based on exchange of one or more data streams generated by the iPerf CLB 530 with the one or more CBSDs/xNBs 206, gathering of spectrum data passively, or other. For instance, a separate logic block/CLB may be tasked with issuing similar requests to the "radio" CLBs for spectrum analysis, while the iPerf CLB 530 is concerned only with iPerf-related KPIs. As can be appreciated, the responding CLBs 532 may be preconfigured to return a prescribed set of data (e.g., according to a prescribed data structure), or alternatively the requesting CLB (iPerf or RF spectrum) can configure each request in a customized fashion; e.g., to request specifically what it wants returned by each responding CLB. Yet other approaches will be recognized by those of ordinary skill given the present disclosure.

Thereafter, the reported KPIs are forward from the requesting CLB to the decision CLB 532d per step 1106.

Based on the forwarded KPIs, the decision CLB 532d can enable each of the radio CLBs 1/2/3/N 532 to create PDN (Packet Data Network) connectivity for initial attachment to the packet gateway 1186, followed by a SAS connection to register and request spectrum) as shown for each of the individual CLBs per steps 1110, 1112, and 1114. Once the registration is complete and spectrum has been granted, the P-GW connections previously established are used as the basis of transaction of the UP (user plane) data between each of the CLBs (acting in effect as a logical proxy for its corresponding radio 503 and the P-GW within the network infrastructure). As such, each of the CLBs of the FPGA of the illustrated embodiment is in effect its own logical endpoint, and can operate substantially independent of the other radios and associated CLBs (including to form aggregations of connections for use in multi-channel packet aggregation or dis-aggregation as described elsewhere herein).

FIGS. 12A-12D are functional block diagrams illustrating various spatial diversity use cases/configurations according to some embodiments of the present disclosure. As shown, the present disclosure contemplates a variety of different CBSD/xNB 206, beam, and propagation path (i.e., direct/indirect multipath) combinations by which a given CPE/FWA 500 can transact multiple signals with the CBSDs/xNBs 206, only a few of which are illustrated, but all of which will be appreciated by one of ordinary skill given the present disclosure.

Figure 12A:
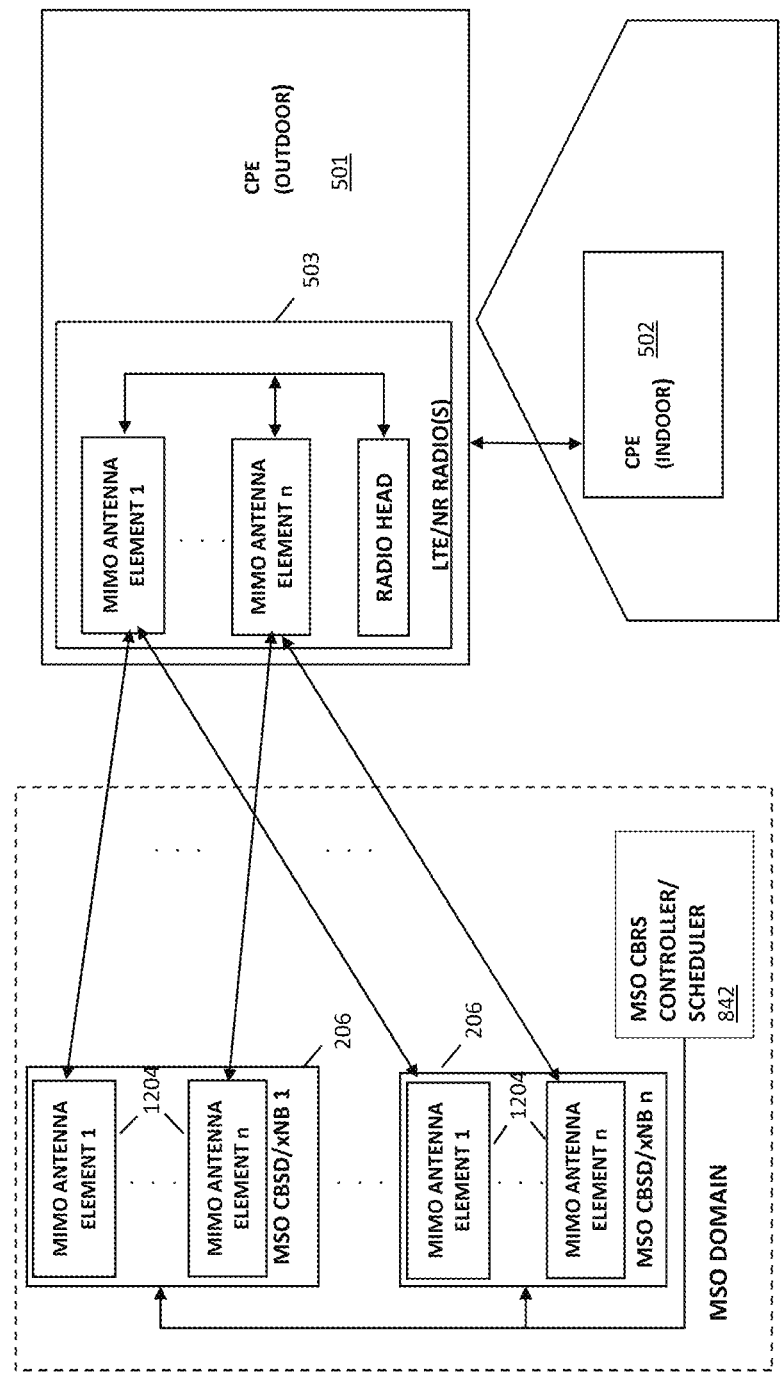
FIGS. 12A-12D are functional block diagrams illustrating various spatial diversity use cases/configurations according to some embodiments of the present disclosure.

For instance, in the embodiment of FIG. 12A, the spatial diversity elements 1 . . . n 1204 associated with a given CBSD/xNB may be communicative with respective ones of the antenna elements 511 of a given radio 503 of the CPE 500 (e.g., elements 1 and 2 respectively of the configuration shown in FIG. 5).

Figure 12B:
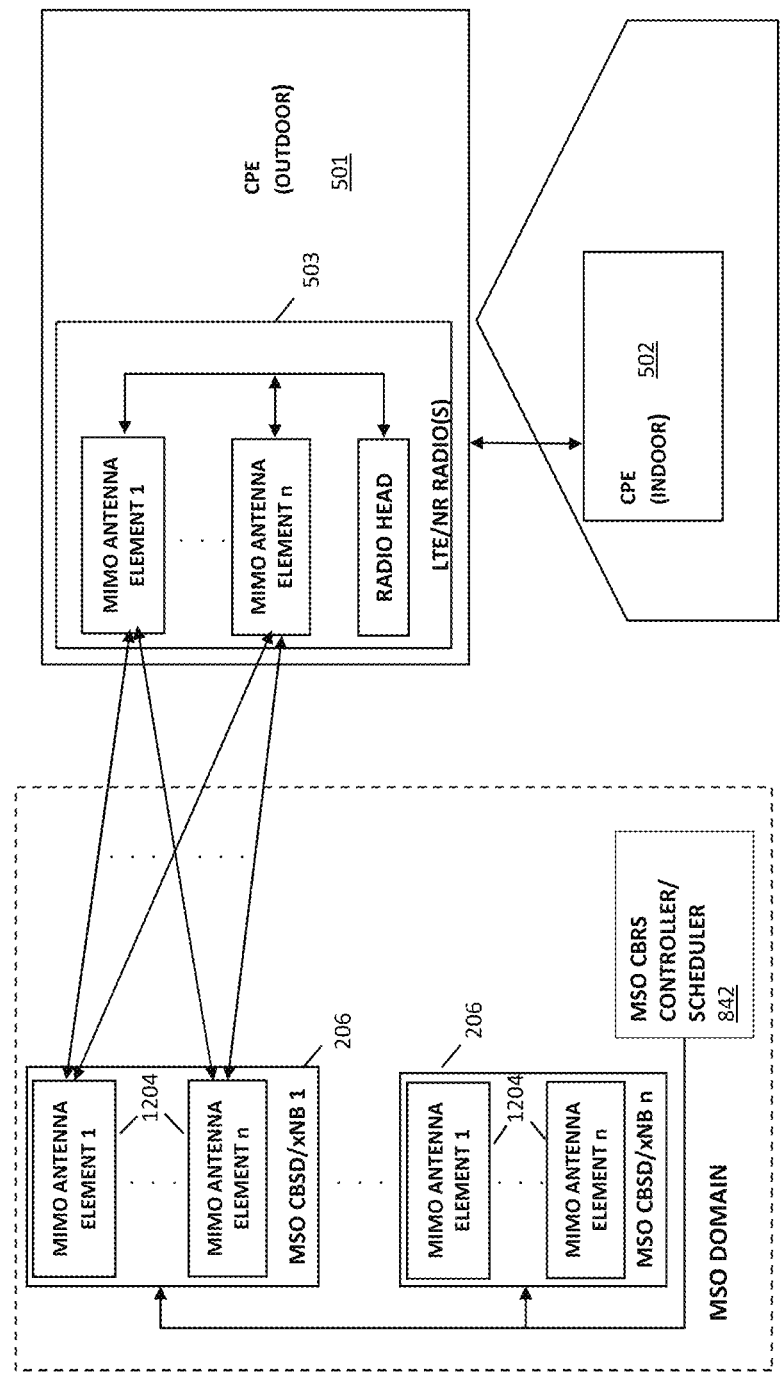

FIG. 12B shows multiple antenna elements 511 of the same radio apparatus 503 communicating with each of multiple corresponding antenna elements of a single CBSD.

Figure 12C:
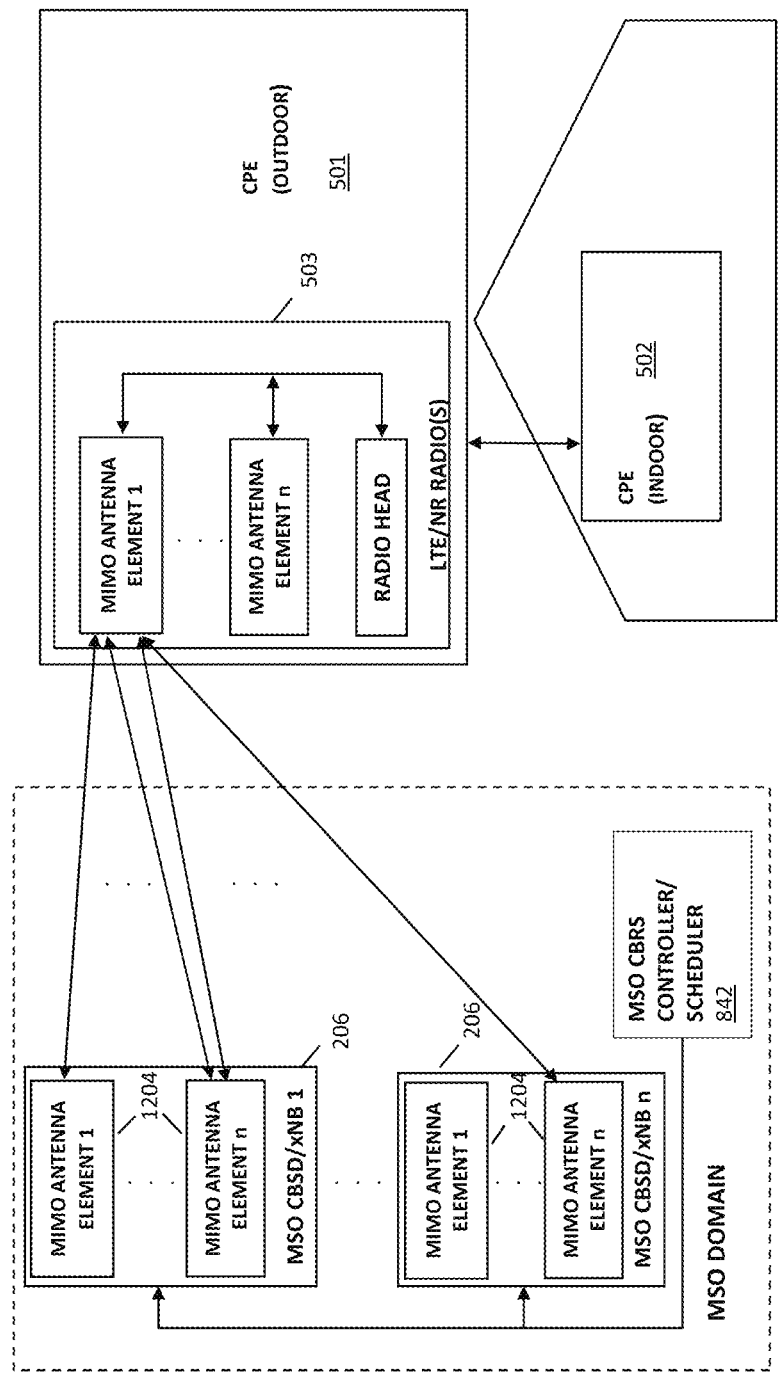

FIG. 12C shows a single antenna element 511 of the same radio apparatus 503 communicating with each of multiple corresponding antenna elements of multiple different CBSDs 206.

Figure 12D:
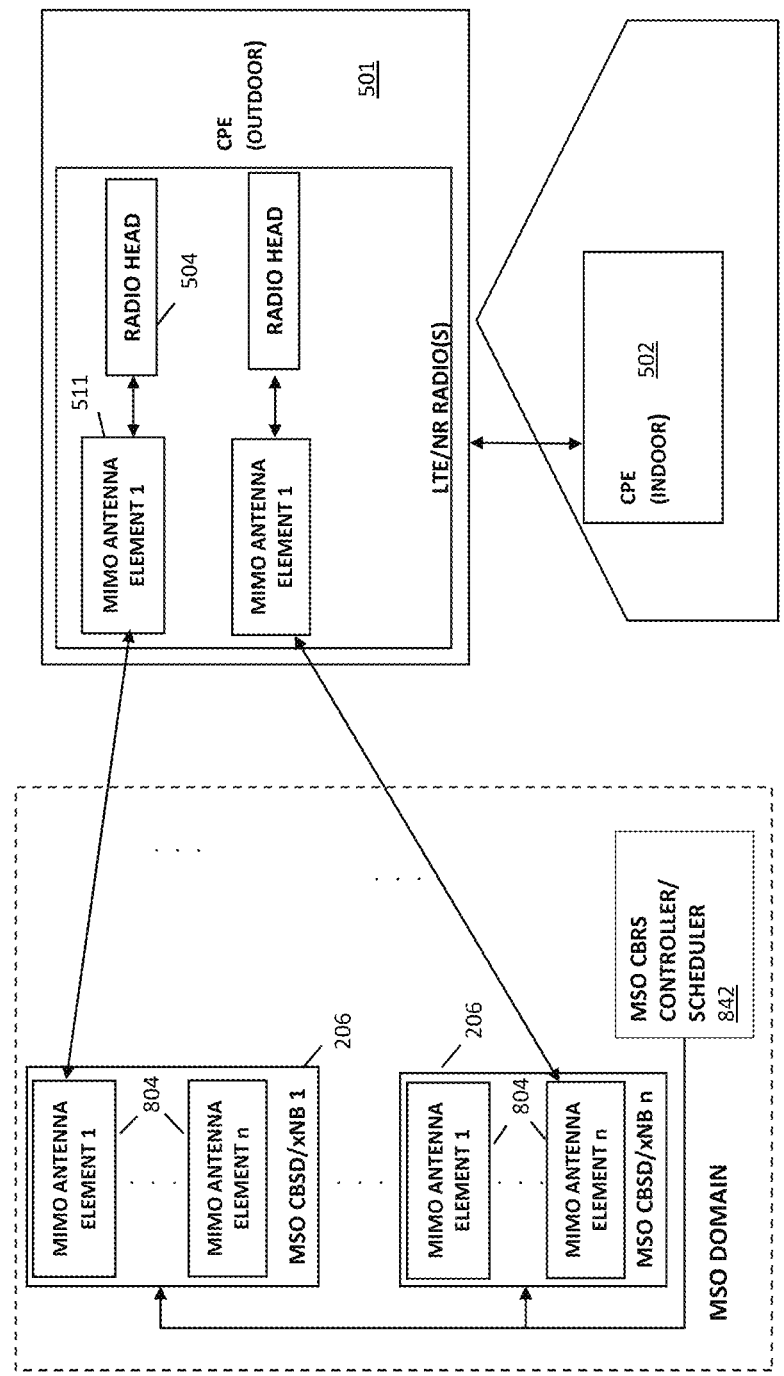

As a further example, FIG. 12D shows a single antenna element 511 of different radio apparatus 503 of the CPE 500 communicating with a corresponding antenna element of respective different CBSDs 206.

Consistent with the use of multiple different radio apparatus 503 and connections (whether with a single CBSD or multiple CBSD), it will further be appreciated that multipath packet processing may be utilized, such as that described in co-pending U.S. patent application Ser. No. 16/738,889 filed Jan. 9, 2020 and entitled "METHODS AND APPARATUS FOR SERVICE PROVISION TO OUT-OF-COVERAGE APPARATUS IN WIRELESS SYSTEMS", as well as U.S. patent application Ser. No. 16/676,188 filed Nov. 6, 2019 and entitled "METHODS AND APPARATUS FOR ENHANCING COVERAGE IN QUASI-LICENSED WIRELESS SYSTEMS," each of the foregoing incorporated herein by reference in its entirety. For example, as described therein, MPTCP or STCP-based protocol stacks and processing may be used to allow for packet aggregation or dis-aggregation at e.g., the transport layer of the CPE 500 (e.g., via the SCTP or MPTCP logic stack 857 shown in FIG. 8), thereby avoiding typical "head of the line" blocking of a standard protocol such as TCP.

It will also be appreciated that while spatial diversity examples are shown in FIGS. 12A-12D, the present disclosure contemplates use of frequency diversity, as well a spectrum "type" diversity across multiple different radios of the CPE 500. For instance, in one variant, different radios 503 and their associated antenna elements 511 use different carrier frequencies for communication with different CBSDs. In another variant, one radio 503 may use GAA spectrum (unlicensed), while another used for a particularly "contentious" or interference-laden physical propagation path or azimuth uses PAL (which is ostensibly much cleaner due to having at least some licensing-type restrictions on use associated therewith).

Use in Out-of-Coverage and Supplementation Scenarios—

It will be appreciated that the CPE apparatus 500 of the present disclosure (including supporting performance and decision logic) may also be utilized in support of other modes of operation such as those described in co-pending U.S. patent application Ser. No. 16/738,889 filed Jan. 9, 2020 and entitled "METHODS AND APPARATUS FOR SERVICE PROVISION TO OUT-OF-COVERAGE APPARATUS IN WIRELESS SYSTEMS", as well as U.S. patent application Ser. No. 16/676,188 filed Nov. 6, 2019 and entitled "METHODS AND APPARATUS FOR ENHANCING COVERAGE IN QUASI-LICENSED WIRELESS SYSTEMS," each of the foregoing incorporated herein by reference in its entirety. For example, as described therein, wireless coverage for an exemplary unlicensed or quasi-licensed CPE that is at or beyond a coverage "edge" of a given network may be provided service via "relay" and/or supplementation of services from a better-positioned "in coverage" CPE of the same network. As such, the various radios and antenna elements (and decision logic) of the various embodiments of the present disclosure can be used to great advantage in such operational scenarios, such as to enable establishment of multiple wireless connections between respective ones of the sectorized radios and corresponding CBSDs within suitable range thereof.

FIGS. 13A-13C illustrate but a few exemplary operational scenarios where the CPE 500 of the present disclosure may be utilized to provide otherwise unattainable service (e.g., being out of coverage) or enhance existing but limited service (in-coverage supplementation) according the above-described techniques.

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein.

While the above detailed description has shown, described, and pointed out novel features of the disclosure as applied to various embodiments, it will be understood that various omissions, substitutions, and changes in the form and details of the device or process illustrated may be made by those skilled in the art without departing from the disclosure. This description is in no way meant to be limiting, but rather should be taken as illustrative of the general principles of the disclosure. The scope of the disclosure should be determined with reference to the claims.

It will be further appreciated that while certain steps and aspects of the various methods and apparatus described herein may be performed by a human being, the disclosed aspects and individual methods and apparatus are generally computerized/computer-implemented. Computerized apparatus and methods are necessary to fully implement these aspects for any number of reasons including, without limitation, commercial viability, practicality, and even feasibility (i.e., certain steps/processes simply cannot be performed by a human being in any viable fashion).

What is claimed is:

1. A computerized method for operating a wireless device within a wireless network having a plurality of base stations, the wireless device comprising a plurality of radio apparatus disposed at varying azimuth angles, the computerized method comprising: detecting a first connectable base station; obtaining, using at least a portion of the plurality of radio apparatus of the wireless device, data relating to one or more network conditions associated with the first connectable base station, wherein each of the plurality of radio apparatus are associated with a respective configurable logic block (CLB), wherein the respective CLBs are part of a logic array apparatus of the wireless device and enable at least one of (i) each of the plurality of radio apparatus to be controlled individually, or (ii) two or more of the plurality of radio apparatus to be controlled collectively; storing the obtained data; iteratively repeating the detecting, the obtaining and the storing for individual ones of the plurality of base stations that are within a wireless range of the wireless device; evaluating the stored obtained data; and establishing a configuration of the wireless device based at least on the evaluating of the stored obtained data for the first connectable base station and the individual ones of the plurality of base stations that are within the wireless range of the wireless device, the establishing of the configuration comprising selecting one or more of the plurality of radio apparatus of the wireless device and one or more of the plurality of base stations between which to establish wireless connections for provision of broadband wireless service via the wireless device; wherein the detecting of the first connectable base station comprises identifying the first connectable base station via logic operative on one or more of the CLBs; and wherein the obtained data relating to the one or more network conditions comprises data relating to one or more radio frequency (RF) parameters associated with RF transmissions by the first connectable base station.

2. The computerized method of claim 1, wherein the detecting of the first connectable base station comprises detecting the first connectable base station utilizing 3GPP (Third Generation Partnership Project) protocols for detection within a Citizens Broadband Radio Service (CBRS) frequency band within which the first connectable base station is operating as a Citizens Broadband Radio Service Device (CBSD), the wireless device configured to scan the CBRS frequency band.

3. The computerized method of claim 1, further comprising establishing a wireless connection with each of the first connectable base station and the one or more of the plurality of base stations; wherein the obtaining of the data comprises using a performance client process operative to execute on the wireless device to obtain at least one of throughput, latency, jitter, or BER (bit error rate) data for the wireless connections with each of the first connectable base station and the one or more of the plurality of base stations.

4. The computerized method of claim 3, wherein the establishing of the configuration comprises: establishing one or more respective wireless connections between the one or more of the plurality of radio apparatus and the one or more of the plurality of base stations; and selecting two of the one or more of the established wireless connections to provide multi-path service for a common application operative on the wireless device, the multi-path service utilizing two respective ones of the CLBs of the logic array apparatus of the wireless device.

5. The computerized method of claim 1, further comprising:
obtaining second data relating to one or more network conditions associated with a plurality of radio apparatus of each of the individual ones of the plurality of base stations that are within the wireless range of the wireless device; and evaluating the obtained second data to rank each of the plurality of radio apparatus of the individual ones of the plurality of base stations that are within the wireless range of the wireless device;
wherein the selecting of the one or more of the plurality of radio apparatus and the one or more of the plurality of base stations between which to establish the wireless connections is based at least on the rank of each of the plurality of radio apparatus of the individual ones of the plurality of base stations that are within the wireless range of the wireless device.

6. The computerized method of claim 1, wherein the selecting of the one or more of the plurality of radio apparatus and the one or more of the plurality of base stations between which to establish the wireless connections comprises selecting the one or more of the plurality of radio apparatus of the wireless device and at least two of the plurality of base stations between which to establish the wireless connections based on a determination that a service level agreement (SLA) cannot be met by use of only one of the plurality of base stations.

7. Integrated circuit (IC) apparatus for configuring a wireless device having a plurality of radio apparatus, the IC apparatus comprising: one or more first configurable logic blocks (CLBs), the one or more first CLBs configured for data communication with one or more of the plurality of radio apparatus via one or more input and output (VO) contacts; one or more second CLBs comprising performance monitoring logic, the performance monitoring logic in data communication with at least a portion of the one or more first CLBs and configured to determine at least one performance parameter associated with wireless connections between the one or more of the plurality of radio apparatus and one or more respective serving base stations; and one or more third CLBs comprising decision making logic, the one or more third CLBs in data communication with the one or more second CLBs and configured to utilize at least the determined at least one performance parameter for respective ones of the wireless connections to decide which of the plurality of radio apparatus to utilize for subsequent operations of the wireless device; wherein the decision of which of the plurality of radio apparatus to utilize for subsequent operations of the wireless device comprises a decision to (i) utilize at least a first one of the plurality of radio apparatus during a first period of time and (ii) utilize at least a second one of the plurality of radio apparatus during a second period of time, the first period of time not overlapping with the second period of time.

8. The IC apparatus of claim 7, wherein one or more of the one or more first or second CLBs are configured to perform at least one of (i) packet aggregation, or (ii) network congestion control, for data packets exchanged between the wireless device and the one or more respective serving base stations via two or more of the wireless connections.

9. A configurable computerized wireless device for use in a wireless network, the configurable computerized wireless device comprising:
programmable logic array apparatus comprising a field programmable gate array apparatus, the field programmable gate array apparatus comprising a plurality of first preconfigured logic blocks; and a plurality of radio apparatus in data communication with the programmable logic array apparatus, the plurality of radio apparatus associated with individual ones of a first portion of the plurality of first preconfigured logic blocks, respectively; wherein the programmable logic array apparatus includes logic configured to, when executed, cause the configurable computerized wireless device to: identify one or more wireless network apparatus communicative with the configurable computerized wireless device, the identification comprising utilization of one or more of the individual ones of the first portion of the plurality of first preconfigured logic blocks to control one or more of the plurality of radio apparatus, respectively; obtain, via use of one or more second preconfigured logic blocks, data relating to one or more network conditions associated with each of the one or more wireless network apparatus, wherein the one or more second preconfigured logic blocks are different from the plurality of first preconfigured logic blocks;
store the obtained data; and change configuration of at least one of the plurality of radio apparatus based at least on the obtained data relating to the one or more network conditions.

10. The configurable computerized wireless device of claim 9, wherein: the plurality of radio apparatus each comprise transceiver apparatus compliant with 3GPP (Third Generation Partnership Project) Long Term Evolution or 5G New Radio protocols and are configured to operate in at least one quasi-licensed frequency band; the configurable computerized wireless device comprises part of a Citizens Broadband Radio Service (CBRS)-compliant Fixed Wireless Access (FWA) device; and the at least one quasi-licensed frequency band comprises a CBRS band between 3.550 and 3.70 GHz, and the at least one quasi-licensed frequency band is assigned to the CBRS-compliant FWA device by a network spectrum allocation device.

11. The configurable computerized wireless device of claim 9, wherein: each of the plurality of radio apparatus comprise one or more antenna elements having a beam width or dispersion less than or equal to a prescribed amount; and the configurable computerized wireless device further comprises a structure having an equilateral geometric shape with at least one of the one or more antenna elements associated with each of a respective facet of the structure.

12. The configurable computerized wireless device of claim 11, wherein the prescribed amount comprises an amount such that an amount of beam overlap between two antenna elements of adjacent ones of the plurality of radio apparatus comprises approximately thirty percent (30%).

13. The configurable computerized wireless device of claim 9, wherein the logic is further configured to, when executed, cause the configurable computerized wireless device to: cause establishment of simultaneous wireless connections via at least two of the plurality of radio apparatus with respective ones of different network apparatus; and enable aggregation or disaggregation of packets associated with a common application of the configurable computerized wireless device from or to the simultaneous wireless connections, respectively.

14. The configurable computerized wireless device of claim 13, wherein the aggregation or disaggregation of the packets comprises aggregation or disaggregation of the packets via a transport layer protocol operative to execute on a processing device of the configurable computerized wireless device.

15. The configurable computerized wireless device of claim 9, wherein the programmable logic array apparatus further comprises second logic configured to, when executed, cause the configurable computerized wireless device to:
utilize data relating to one or more rules to determine which one of the one or more wireless network apparatus to connect, the determination based at least in part on the obtained data relating to the one or more network conditions.

16. The configurable computerized wireless device of claim 9, wherein the programmable logic array apparatus further comprises second logic configured to, when executed, cause the configurable computerized wireless device to:
cause transmission of the obtained data to a network-based computerized process via at least one of the plurality of radio apparatus and a wireless network apparatus in wireless communication therewith according to an existing configuration; and
utilize data received from the network-based computerized process to implement a change or modification to the existing configuration, the change or modification comprising at least utilization of a different subset of the plurality of radio apparatus for wireless communication to or from the configurable computerized wireless device.

17. The configurable computerized wireless device of claim 9, wherein the programmable logic array apparatus further comprises second logic configured to, when executed, cause the configurable computerized wireless device to:
evaluate the obtained data to determine respective ranks of the one or more wireless network apparatus; and identify one or more second wireless network apparatus based at least on the determined ranks; wherein the change of the configuration of the at least one of the plurality of radio apparatus (i) is based at least on the evaluation, and (ii) comprises a change of the configuration of the at least one of the plurality of radio apparatus to establish data communication with the one or more second wireless network apparatus.

18. The configurable computerized wireless device of claim 17, wherein: the logic is further configured to, when executed, cause the configurable computerized wireless device to: obtain second data relating to one or more network conditions associated with each of a plurality of radio apparatus of each of the one or more wireless network apparatus; store the obtained second data; and
evaluate the obtained second data to determine respective ranks of the plurality of radio apparatus of the one or more wireless network apparatus; and the determination of the respective ranks of the one or more wireless network apparatus is based at least one the respective ranks of the plurality of radio apparatus of the one or more wireless network apparatus.

19. The configurable computerized wireless device of claim 18, wherein the logic is further configured to, when executed, cause the configurable computerized wireless device to: based on the evaluation of the obtained second data, generate a data structure of at least one of channel or link quality data for each of the plurality of radio apparatus of the one or more wireless network apparatus.

* * * * *